(12) United States Patent
Brown et al.

(10) Patent No.: US 9,836,177 B2
(45) Date of Patent: Dec. 5, 2017

(54) PROVIDING VARIABLE RESPONSES IN A VIRTUAL-ASSISTANT ENVIRONMENT

(75) Inventors: Fred A Brown, Colbert, WA (US);
Tanya M Miller, Colbert, WA (US);
Mark Zartler, Garland, TX (US)

(73) Assignee: Next IT Innovation Labs, LLC, Spokane Valley, WA (US)

( * ) Notice: Subject to any disclaimer, the term of this patent is extended or adjusted under 35 U.S.C. 154(b) by 0 days.

(21) Appl. No.: 13/341,261

(22) Filed: Dec. 30, 2011

(65) Prior Publication Data
US 2013/0174034 A1    Jul. 4, 2013

(51) Int. Cl.
*G06F 3/048* (2013.01)
*G06F 17/30* (2006.01)
*G06Q 10/10* (2012.01)

(52) U.S. Cl.
CPC ........ *G06F 3/048* (2013.01); *G06F 17/30864* (2013.01); *G06F 17/30976* (2013.01); *G06Q 10/10* (2013.01); *G06F 2203/04803* (2013.01)

(58) Field of Classification Search
CPC ..................................................... G06F 3/048
USPC ....................................................... 715/708
See application file for complete search history.

(56) References Cited

U.S. PATENT DOCUMENTS

| | | |
|---|---|---|
| 5,278,980 A | 1/1994 | Pedersen et al. |
| 5,339,391 A | 8/1994 | Wroblewski et al. |
| 5,418,948 A | 5/1995 | Turtle |
| 5,535,120 A | 7/1996 | Chong et al. |
| 5,615,112 A | 3/1997 | Liu Sheng et al. |
| 5,677,835 A | 10/1997 | Carbonell et al. |
| 5,682,539 A | 10/1997 | Conrad et al. |
| 5,727,174 A | 3/1998 | Aparicio, IV et al. |
| 6,012,053 A | 1/2000 | Pant et al. |
| 6,112,177 A | 8/2000 | Cosatto et al. |
| 6,144,938 A | 11/2000 | Surace et al. |
| 6,175,829 B1 | 1/2001 | Li et al. |
| 6,282,507 B1 | 8/2001 | Horiguchi et al. |
| 6,285,978 B1 | 9/2001 | Bernth et al. |
| 6,353,817 B1 | 3/2002 | Jacobs et al. |
| 6,388,665 B1 | 5/2002 | Linnett et al. |
| 6,396,951 B1 | 5/2002 | Grefenstette |
| 6,401,061 B1 | 6/2002 | Zieman |
| 6,658,627 B1 | 12/2003 | Gallup et al. |
| 6,661,418 B1 | 12/2003 | McMillan et al. |
| 6,757,362 B1 | 6/2004 | Cooper et al. |
| 6,826,540 B1 | 11/2004 | Plantec et al. |

(Continued)

FOREIGN PATENT DOCUMENTS

| | | |
|---|---|---|
| CN | 103051669 | 4/2013 |
| WO | WO2011088053 | 7/2011 |

OTHER PUBLICATIONS

U.S. Appl. No. 13/774,381, filed Feb. 22, 2013, Fred A. Brown et al., "Interaction with a Portion of a Content Item through a Virtual Assistant," 68 pages.

(Continued)

*Primary Examiner* — Xuyang Xia
(74) *Attorney, Agent, or Firm* — Lee & Hayes, PLLC

(57) ABSTRACT

Virtual assistants intelligently emulate a representative of a service provider by providing variable responses to user queries received via the virtual assistants. These variable responses may take the context of a user's query into account both when identifying an intent of a user's query and when identifying an appropriate response to the user's query.

31 Claims, 13 Drawing Sheets

(56) References Cited

U.S. PATENT DOCUMENTS

| | | |
|---|---|---|
| 6,829,603 B1 | 12/2004 | Chai et al. |
| 6,834,120 B1 | 12/2004 | LeClerc et al. |
| 6,987,514 B1* | 1/2006 | Beresin ............... G10L 13/033 345/473 |
| 6,999,932 B1 | 2/2006 | Zhou |
| 7,058,902 B2 | 6/2006 | Iwema et al. |
| 7,076,430 B1 | 7/2006 | Cosatto et al. |
| 7,194,483 B1 | 3/2007 | Mohan et al. |
| 7,263,493 B1 | 8/2007 | Provost et al. |
| 7,337,158 B2 | 2/2008 | Fratkina et al. |
| 7,426,697 B2 | 9/2008 | Holecek et al. |
| 7,483,829 B2 | 1/2009 | Murakami et al. |
| 7,536,413 B1 | 5/2009 | Mohan et al. |
| 7,539,656 B2 | 5/2009 | Fratkina et al. |
| 7,548,899 B1 | 6/2009 | Del Favero, Jr. et al. |
| 7,558,792 B2 | 7/2009 | Bier |
| 7,599,831 B2 | 10/2009 | Ford |
| 7,610,382 B1 | 10/2009 | Siegel |
| 7,711,547 B2 | 5/2010 | Abir |
| 7,739,604 B1 | 6/2010 | Lyons et al. |
| 7,797,146 B2 | 9/2010 | Harless et al. |
| 7,818,183 B2 | 10/2010 | Schoenberg |
| 7,912,701 B1 | 3/2011 | Gray et al. |
| 7,970,663 B2 | 6/2011 | Ganz et al. |
| 8,160,979 B1 | 4/2012 | Evans et al. |
| 8,346,563 B1 | 1/2013 | Hjelm et al. |
| 8,352,266 B2 | 1/2013 | Farmaner et al. |
| 8,401,842 B1 | 3/2013 | Ginzburg et al. |
| 8,433,556 B2 | 4/2013 | Fraser et al. |
| 8,473,420 B2 | 6/2013 | Bohus et al. |
| 8,510,276 B2 | 8/2013 | Haiby et al. |
| 8,519,963 B2 | 8/2013 | Kocienda et al. |
| 8,670,979 B2 | 3/2014 | Gruber et al. |
| 8,677,377 B2 | 3/2014 | Cheyer et al. |
| 8,731,929 B2 | 5/2014 | Kennewick et al. |
| 8,756,326 B1 | 6/2014 | Elberse et al. |
| 8,762,152 B2 | 6/2014 | Bennett et al. |
| 8,930,191 B2 | 1/2015 | Gruber et al. |
| 8,942,986 B2 | 1/2015 | Cheyer et al. |
| 8,943,094 B2 | 1/2015 | Brown et al. |
| 9,117,447 B2 | 8/2015 | Gruber et al. |
| 9,202,171 B2 | 12/2015 | Kuhn |
| 9,501,741 B2 | 11/2016 | Cheyer et al. |
| 2001/0000356 A1 | 4/2001 | Woods |
| 2001/0033298 A1 | 10/2001 | Slotznick |
| 2001/0044751 A1 | 11/2001 | Pugliese, III et al. |
| 2001/0049688 A1 | 12/2001 | Fratkina et al. |
| 2001/0053968 A1 | 12/2001 | Galitsky et al. |
| 2002/0008716 A1 | 1/2002 | Colburn et al. |
| 2002/0032591 A1 | 3/2002 | Mahaffy et al. |
| 2002/0123994 A1 | 9/2002 | Schabes et al. |
| 2002/0129031 A1 | 9/2002 | Lau et al. |
| 2002/0198885 A1 | 12/2002 | Streepy, Jr. |
| 2003/0004908 A1 | 1/2003 | Linthicum et al. |
| 2003/0041307 A1 | 2/2003 | Park |
| 2003/0061029 A1 | 3/2003 | Shaket |
| 2003/0088547 A1 | 5/2003 | Hammond |
| 2003/0126089 A1 | 7/2003 | Fukuoka et al. |
| 2003/0126090 A1 | 7/2003 | Fukuoka et al. |
| 2003/0142829 A1 | 7/2003 | Avigni |
| 2003/0212544 A1 | 11/2003 | Acero et al. |
| 2004/0107088 A1 | 6/2004 | Budzinski |
| 2004/0141013 A1 | 7/2004 | Alcazar et al. |
| 2004/0186705 A1 | 9/2004 | Morgan et al. |
| 2005/0027694 A1 | 2/2005 | Sauermann |
| 2005/0054381 A1 | 3/2005 | Lee et al. |
| 2005/0120276 A1 | 6/2005 | Kolawa et al. |
| 2006/0004826 A1 | 1/2006 | Zartler et al. |
| 2006/0020466 A1 | 1/2006 | Cousineau et al. |
| 2006/0036430 A1 | 2/2006 | Hu |
| 2006/0037076 A1 | 2/2006 | Roy |
| 2006/0047632 A1 | 3/2006 | Zhang |
| 2006/0067352 A1 | 3/2006 | John et al. |
| 2006/0074689 A1 | 4/2006 | Cosatto et al. |
| 2006/0080107 A1 | 4/2006 | Hill et al. |
| 2006/0092978 A1 | 5/2006 | John et al. |
| 2006/0161414 A1 | 7/2006 | Carignano et al. |
| 2006/0253427 A1 | 11/2006 | Wu et al. |
| 2007/0043687 A1 | 2/2007 | Bodart et al. |
| 2007/0100790 A1 | 5/2007 | Cheyer et al. |
| 2007/0106670 A1 | 5/2007 | Yoakum et al. |
| 2007/0130112 A1 | 6/2007 | Lin |
| 2007/0134631 A1 | 6/2007 | Hardy et al. |
| 2007/0156677 A1 | 7/2007 | Szabo |
| 2007/0185702 A1 | 8/2007 | Harney et al. |
| 2007/0197296 A1 | 8/2007 | Lee |
| 2007/0242656 A1 | 10/2007 | Klassen et al. |
| 2007/0265533 A1 | 11/2007 | Tran |
| 2007/0294229 A1 | 12/2007 | Au |
| 2008/0005158 A1 | 1/2008 | Zartler et al. |
| 2008/0010268 A1 | 1/2008 | Liao et al. |
| 2008/0016040 A1 | 1/2008 | Jones et al. |
| 2008/0036756 A1 | 2/2008 | Gaos et al. |
| 2008/0091406 A1 | 4/2008 | Baldwin et al. |
| 2008/0133444 A1 | 6/2008 | Gao et al. |
| 2008/0162498 A1 | 7/2008 | Omoigui |
| 2008/0222734 A1 | 9/2008 | Redlich et al. |
| 2008/0235604 A1 | 9/2008 | Ebert |
| 2008/0305815 A1 | 12/2008 | McDonough |
| 2009/0006525 A1* | 1/2009 | Moore ............... G06Q 30/02 709/202 |
| 2009/0030800 A1 | 1/2009 | Grois |
| 2009/0063427 A1 | 3/2009 | Zuta et al. |
| 2009/0070103 A1 | 3/2009 | Beggelman et al. |
| 2009/0077488 A1 | 3/2009 | Ording |
| 2009/0089100 A1 | 4/2009 | Nenov et al. |
| 2009/0119095 A1 | 5/2009 | Beggelman et al. |
| 2009/0119587 A1 | 5/2009 | Allen et al. |
| 2009/0157386 A1 | 6/2009 | Zhou |
| 2009/0171923 A1 | 7/2009 | Nash et al. |
| 2009/0182702 A1 | 7/2009 | Miller |
| 2009/0204677 A1 | 8/2009 | Michaelis et al. |
| 2009/0216691 A1* | 8/2009 | Borzestowski et al. ........ 706/11 |
| 2009/0225041 A1 | 9/2009 | Kida et al. |
| 2009/0227223 A1 | 9/2009 | Jenkins |
| 2009/0228264 A1 | 9/2009 | Williams et al. |
| 2009/0235356 A1 | 9/2009 | Jensen et al. |
| 2009/0248399 A1 | 10/2009 | Au |
| 2009/0271205 A1 | 10/2009 | Finn et al. |
| 2010/0005122 A1 | 1/2010 | Jackson |
| 2010/0030549 A1 | 2/2010 | Lee et al. |
| 2010/0050237 A1* | 2/2010 | Bokor ............... G06Q 30/02 726/4 |
| 2010/0070448 A1 | 3/2010 | Omoigui |
| 2010/0070871 A1 | 3/2010 | Liesche et al. |
| 2010/0153398 A1 | 6/2010 | Miller et al. |
| 2010/0169336 A1* | 7/2010 | Eckhoff-Hornback et al. ............... 707/758 |
| 2010/0218113 A1 | 8/2010 | White et al. |
| 2010/0226490 A1 | 9/2010 | Schultz et al. |
| 2010/0235808 A1 | 9/2010 | Dayan et al. |
| 2010/0281012 A1 | 11/2010 | Imig et al. |
| 2010/0312547 A1 | 12/2010 | Van Os et al. |
| 2011/0071819 A1 | 3/2011 | Miller et al. |
| 2011/0078105 A1 | 3/2011 | Wallace |
| 2011/0119196 A1 | 5/2011 | Ventura et al. |
| 2011/0179126 A1* | 7/2011 | Wetherell et al. ............ 709/206 |
| 2011/0213642 A1 | 9/2011 | Makar et al. |
| 2011/0282664 A1 | 11/2011 | Tanioka et al. |
| 2011/0288947 A1 | 11/2011 | Biran |
| 2011/0301982 A1 | 12/2011 | Green, Jr. et al. |
| 2011/0307245 A1 | 12/2011 | Hanneman et al. |
| 2012/0016678 A1* | 1/2012 | Gruber et al. ............... 704/275 |
| 2012/0022872 A1 | 1/2012 | Gruber et al. |
| 2012/0030553 A1 | 2/2012 | Delpha et al. |
| 2012/0041903 A1 | 2/2012 | Beilby et al. |
| 2012/0078891 A1 | 3/2012 | Brown et al. |
| 2012/0110473 A1* | 5/2012 | Tseng ............... G06Q 50/01 715/753 |
| 2012/0117005 A1 | 5/2012 | Spivack |
| 2012/0221502 A1 | 8/2012 | Jerram et al. |
| 2012/0245926 A1 | 9/2012 | Montyne et al. |
| 2012/0253825 A1 | 10/2012 | Di Fabbrizio et al. |
| 2012/0265528 A1 | 10/2012 | Gruber et al. |

(56) References Cited

U.S. PATENT DOCUMENTS

| | | |
|---|---|---|
| 2012/0284040 A1 | 11/2012 | Dupin |
| 2012/0311541 A1 | 12/2012 | Bullard et al. |
| 2013/0017523 A1 | 1/2013 | Barborak et al. |
| 2013/0031476 A1 | 1/2013 | Coin et al. |
| 2013/0046149 A1 | 2/2013 | Gettelman et al. |
| 2013/0152092 A1 | 6/2013 | Yadgar |
| 2013/0204813 A1 | 8/2013 | Master et al. |
| 2013/0254139 A1 | 9/2013 | Lei |
| 2013/0258040 A1 | 10/2013 | Kaytaz et al. |
| 2013/0262467 A1 | 10/2013 | Zhang et al. |
| 2013/0275875 A1 | 10/2013 | Gruber et al. |
| 2013/0283168 A1 | 10/2013 | Brown et al. |
| 2014/0029734 A1 | 1/2014 | Kim et al. |
| 2014/0040748 A1 | 2/2014 | Lemay et al. |
| 2014/0047001 A1 | 2/2014 | Phillips et al. |
| 2014/0053102 A1 | 2/2014 | Lee et al. |
| 2014/0074454 A1 | 3/2014 | Brown et al. |
| 2014/0115456 A1 | 4/2014 | White et al. |
| 2014/0164476 A1 | 6/2014 | Thomson |
| 2014/0164508 A1 | 6/2014 | Lynch et al. |
| 2014/0181741 A1 | 6/2014 | Apacible et al. |
| 2014/0201675 A1 | 7/2014 | Joo et al. |
| 2014/0244266 A1 | 8/2014 | Brown et al. |
| 2014/0244712 A1 | 8/2014 | Walters et al. |
| 2014/0245140 A1 | 8/2014 | Brown et al. |
| 2014/0282109 A1 | 9/2014 | Wenger et al. |
| 2014/0297284 A1 | 10/2014 | Gruber et al. |
| 2014/0310005 A1 | 10/2014 | Brown et al. |
| 2014/0317502 A1 | 10/2014 | Brown et al. |
| 2014/0337048 A1 | 11/2014 | Brown et al. |
| 2014/0343924 A1 | 11/2014 | Brown et al. |
| 2014/0343928 A1 | 11/2014 | Brown et al. |
| 2014/0365223 A1 | 12/2014 | Brown et al. |
| 2014/0365407 A1 | 12/2014 | Brown et al. |
| 2015/0066817 A1 | 3/2015 | Slayton et al. |
| 2015/0185996 A1 | 7/2015 | Brown et al. |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0363697 A1 | 12/2015 | Spivack |
| 2016/0012186 A1 | 1/2016 | Zasowski et al. |
| 2016/0110071 A1 | 4/2016 | Brown et al. |
| 2017/0132220 A1 | 5/2017 | Brown et al. |

OTHER PUBLICATIONS

U.S. Appl. No. 13/774,519, filed Feb. 22, 2013, Fred A. Brown et al, "Virtual Assistant Transfer between Smart Devices," 65 pages.
Office action for U.S. Appl. No. 14/302,096, dated Oct. 8, 2014, Brown, "Active Lab", 27 pages.
Office action for U.S. Appl. No. 12/636,571, dated Aug. 14, 2014, Miller et al., "Leveraging Concepts With Information Retrieval Techniques and Knowledge Bases", 35 pages.
Office action for U.S. Appl. No. 14/467,221, dated Oct. 9, 2014, Brown, "Context-Based Virtual Assistant Conversations", 24 pages.
Final Office Action for U.S. Appl. No. 12/014,229, dated Nov. 25, 2013, Tanya M. Miller, "Active Lab", 15 pages.
Final Office Action for U.S. Appl. No. 12/636,571, dated Nov. 7, 2013, Tanya Miller, "Leveraging Concepts With Information Retrieval Techniques and Knowledge Bases", 31 pages.
Non-Final Office Action for U.S. Appl. No. 12/564,546, dated Dec. 21, 2011, Tanya Miller et al., "Apparatus, System, and Method for Natural Language Processing", 12 pages.
Final Office Action for U.S. Appl. No. 12/564,546, dated Feb. 26, 2013, Tanya Miller et al., "Apparatus, System, and Method for Natural Language Processing", 15 pages.
Non-Final Office Action for U.S. Appl. No. 12/014,229, dated Mar. 15, 2013, Tanya M. Miller, "Active Lab", 14 pages.
Non-Final Office Action for U.S. Appl. No. 12/636,571, dated Apr. 12, 2013, Tanya Miller et al., "Leveraging Concepts With Information Retrieval Techniques and Knowledge Bases", 31 pages.
Non-Final Office Action for U.S. Appl. No. 12/564,546, dated Jun. 12, 2013, Tanya Miller et al., "Apparatus, System, and Method for Natural Language Processing", 18 pages.
"AskJennMediaCoverage", retrieved on Nov. 12, 2014, 76 pages.
Cassell, et al., "Embodied Conversational Agents", MIT Press, 2000, pp. 272 and 275.
Office Action for U.S. Appl. No. 14/467,715, dated Oct. 1, 2014, Fred Brown, "Virtual Assistant Conversations", 14 pages.
Final Office Action for U.S. Appl. No. 14/293,673, dated Dec. 4, 2014, Fred A. Brown, "Virtual Assistant Conversations", 22 pages.
Office Action for U.S. Appl. No. 14/315,852, dated Dec. 4, 2014, Fred Brown, "Virtual Assistant Conversations for Ambiguous User Input and Goals", 15 pages.
Office Action for U.S. Appl. No. 14/451,009, dated Dec. 4, 2014, Fred Brown, "Wearable-Based Virtual Agents", 9 pages.
Office action for U.S. Appl. No. 14/293,529, dated Sep. 10, 2014, Brown et al., "Virtual Assistant Team Identification", 13 pages.
Office action for U.S. Appl. No. 14/293,619, dated Sep. 8, 2014, Brown et al., "Virtual Assistant Acquisitions and Training", 15 pages.
Office action for U.S. Appl. No. 14/293,673, dated Sep. 8, 2014, Riegler et al., "Virtual Assistant Conversations", 22 pages.
Office Action for U.S. Appl. No. 14/302,096, dated Jan. 12, 2015, Fred Brown, "Active Lab", 4 pages.
PCT Search Report and Written Opinion dated Nov. 12, 2014 for PCT Application No. PCT/US14/31047, 14 Pages.
"The Armys Robot Recruiter", Transcript from New York Public Radio, Aug. 8, 2014, 3 pages.
"Undercover Virtual Agent Article", KOMO News, retrieved Nov. 12, 2014, 2 pages.
"Case Study with Alme, Alaska Airlines soars", retrieved on Apr. 10, 2015 at <<http://www.nextit.com/media/downloads/Case-study-Alaska-Air.pdf>>, 3 pages.
"Frost & Sullivan Commends Next IT for Leading the Virtual Agent Applications Industry in Competitive Strategy Innovation", Frost & Sullivan, Dec. 18, 2014, 5 pages.
"Meet Jenn, Your Virtual Assistant at alaskaair.com", retrieved on Apr. 13, 2015 at <<http://www.alaskaair.com/content/about-us/site-info/ask-jenn.aspx>>, 1 page.
Office Action for U.S. Appl. No. 12/014,229, dated Feb. 13, 2015, Tanya M. Miller, "Active Lab", 16 pages.
Office action for U.S. Appl. No. 14/293,586, dated Feb. 17, 2015, Brown et al., "Virtual Assistant Team Customization", 11 pages.
Office action for U.S. Appl. No. 14/467,221, dated Feb. 17, 2015, Brown et al., "Context-Based Virtual Assistant Conversations", 5 pages.
Final Office Action for U.S. Appl. No. 14/293,529, dated Feb. 23, 2015, Fred A. Brown, "Virtual Assistant Team Identification", 17 pages.
Final Office Action for U.S. Appl. No. 14/315,852, dated Apr. 10, 2015, Fred Brown, "Virtual Assistant Conversations for Ambiguous User Input and Goals", 18 pages.
Final Office Action for U.S. Appl. No. 14/293,619, dated Apr. 13, 2015, Fred A. Brown, "Virtual Assistant Acquisitions and Training", 17 pages.
Final Office Action for U.S. Appl. No. 14/467,715, dated Apr. 16, 2015, Fred Brown, "Virtual Assistant Conversations", 5 pages.
"SGT STAR Wins Intelligent Assistant Award", San Francisco, Calif (PRWEB) Sep. 24, 2014, PRWEB Online Visibility from Vocus, 2 pages.
"TAM", Case Study Meet Juli—TAM Airlines' most famous new hire, Next IT Corporation, 2 pages.
PCT Search Report and Written Opinion dated Sep. 2, 2015 for PCT Application No. PCT/US15/33594, 9 pages.
Final Office Action for U.S. Appl. No. 12/636,571, dated Jun. 12, 2015, Tanya Miller, "Leveraging Concepts With Information Retrieval Techniques and Knowledge Bases", 37 pages.
Final Office Action for U.S. Appl. No. 14/293,529, dated Jun. 15, 2015, Fred A. Brown, "Virtual Assistant Team Identification", 16 pages.
Final Office Action for U.S. Appl. No. 14/293,586, dated Jul. 24, 2015, Fred A. Brown, "Virtual Assistant Team Customization", 14 pages.

(56) References Cited

OTHER PUBLICATIONS

Office Action for U.S. Appl. No. 14/293,673, dated Jul. 24, 2015, Fred A. Brown, "Virtual Assistant Conversations", 25 pages.
Final Office Action for U.S. Appl. No. 14/302,096, dated Jul. 29, 2015, Fred Brown, "Active Lab", 7 pages.
Office Action for U.S. Appl. No. 14/293,619, dated Aug. 13, 2015, Fred A. Brown, "Virtual Assistant Acquisitions and Training", 17 pages.
Office action for U.S. Appl. No. 14/293,673, dated Jan. 15, 2016, Brown et al., "Virtual Assistant Conversations," 29 pages.
Office action for U.S. Appl. No. 14/451,009, dated Jan. 5, 2016, Brown et al., "Wearable-Based Virtual Agents," 10 pages.
Office action for U.S. Appl. No. 14/467,221, dated Feb. 18, 2016, Brown et al., "Context-Based Virtual Assistant Conversations," 14 pages.
Office action for U.S. Appl. No. 14/293,619, dated Feb. 26, 2016, Brown et al., "Virtual Assistant Acquisitions and Training," 16 pages.
Office Action for U.S. Appl. No. 14/293,529, dated Oct. 1, 2015, Fred A. Brown, "Virtual Assistant Team Identification", 18 pages.
Office Action for U.S. Appl. No. 14/315,852, dated Sep. 24, 2015, Fred Brown, "Virtual Assistant Conversations for Ambiguous User Input and Goals", 6 pages.
Office action for U.S. Appl. No. 12/014,229, dated Nov. 19, 2015, Inventor #1, "Active Lab", 8 pages.
Pandorabots Inc., "AIML Targeting: Supervised Learning for Bots", uploaded on Oct. 29, 2009, at https:// www.youtube.com/watch?v=aGe30NTVDOk, 5 pages.
Office action for U.S. Appl. No. 14/446,153, dated Aug. 25, 2016, Brown et al., "Conversational Virtual Healthcare Assistant", 13 pages.
Office action for U.S. Appl. No. 14/293,529, dated Aug. 31, 2016, Brown et al., "Virtual Assistant Team Identification", 18 pages.
Office action for U.S. Appl. No. 14/293,529, dated Mar. 17, 2016, Brown et al., "Virtual Assistant Team Identification", 19 pages.
Office action for U.S. Appl. No. 12/636,571, dated Mar. 24, 2016, Miller et al., "Leveraging Concepts With Information Retrieval Techniques and Knowledge Bases", 31 pages.
Office action for U.S. Appl. No. 14/446,153, dated Mar. 25, 2016 Brown et al., "Conversational Virtual Healthcare Assistant", 7 pages.
Final Office Action for U.S. Appl. No. 14/446,153, dated Apr. 29, 2015, Fred A. Brown, "Conversational Virtual Healthcare Assistant", 9 pages.
Final Office Action for U.S. Appl. No. 13/449,927, dated Apr. 9, 2015, Fred A. Brown, "Conversation User Interface", 35 pages.
Office action for U.S. Appl. No. 14/467,715, dated May 18, 2016, Brown et al., "Virtual Assistant Conversations", 14 pages.
Office Action for U.S. Appl. No. 13/607,414, dated Jul. 21, 2015, Fred A. Brown, "Conversational Virtual Healthcare Assistant", 25 pages.
Office Action for U.S. Appl. No. 13/449,927, dated Aug. 15, 2014, Fred A. Brown, "Conversation User Interface", 29 pages.
Office Action for U.S. Appl. No. 14/446,153, dated Sep. 18, 2015, Fred A. Brown, "Conversational Virtual Healtcare Assistant", 11 pages.
Office Action for U.S. Appl. No. 14/446,153, dated Sep. 26, 2014, Fred A. Brown, "Conversational Virtual Healthcare Assistant", 7 pages.
Office action for U.S. Appl. No. 14/451,009, dated Jul. 15, 2016, Brown et al., "Wearable-Based Virtual Agents", 6 pages.
AppleKeynotes, "Apple Special Event 2011—Siri Introduction", YouTube, retrieved on Oct. 21, 2016 at <<https://www.youtube.com/watch?v=agzltTz35QQ>>, Mar. 22, 2013, 1 page.
Supplementary European Search Report dated Oct. 31, 2016 for European Patent Application No. 14785575.3, 10 pages.
Office action for U.S. Appl. No. 14/293,619, dated Oct. 6, 2016, Brown et al., "Virtual Assistant Acquisitions and Training", 17 pages.
Office action for U.S. Appl. No. 14/293,673, dated Nov. 1, 2016, Brown et al., "Virtual Assistant Conversations", 34 pages.
Office action for U.S. Appl. No. 12/014,229, dated Nov. 16, 2016, Miller, "Active Lab", 8 pages.
Office action for U.S. Appl. No. 14/467,221, dated Nov. 3, 2016, Brown et al., "Context-Based Virtual Assistant Conversations", 15 pages.
Office action for U.S. Appl. No. 13/865,789, dated Nov. 7, 2016, Brown et al., "Virtual Assistant Focused User Interfaces", 20 pages.
Office action for U.S. Appl. No. 14/467,715, dated Dec. 1, 2016, Brown et al., "Virtual Assistant Conversations", 10 pages.
Office action for U.S. Appl. No. 14/293,586, dated Sep. 23, 2016, Brown et al., "Virtual Assistant Team Customization", 9 pages.
Office Action for U.S. Appl. No. 14/302,096, dated Sep. 27, 2016, Brown et al., "Regression Testing", 6 pages.
Office action for U.S. Appl. No. 14/467,221, dated Jul. 25, 2017, Brown et al., "Context-Based Virtual Assistant Conversations", 15 pages.
Office Action for U.S. Appl. No. 14/467,715, dated Jul. 25, 2017, Brown et al., "Virtual Assistant Conversations", 12 pages.
Langkilde, Irene et al., "Automatic Prediction of Problematic Human-Computer Dialogues in 'How May I Help You?'", AT&T Labs Research, 1999, 5 pages.
Extended European Search Report dated Mar. 17, 2017 for European patent application No. 14785575.3, 16 pages.
Walker, Marilyn et al., "Learning to Predict Problematic Situations in a Spoken Dialogue System: Experiments with How May I Help You?", AT&T Labs Research, NAACL 2000 Proceedings of the 1st North American chapter of the Association for Computational Linguistics conference, Seattle, Washington, Apr. 29-May 4, 2000, 8 pages.
Office Action for U.S. Appl. No. 14/293,529, dated Jan. 31, 2017, Fred A. Brown, "Virtual Assistant Team Identification", 20 pages.
Office Action for U.S. Appl. No. 14/837,282, dated Jan. 20, 2017, Spivack, "System and Method for Providing Distributed Intelligent Assistance,", 16 pages.
Office Action for U.S. Appl. No. 13/271,175, dated Oct. 7, 2014, Nova T. Spivack, "System and Method for Providing Distributed Intelligent Assistance", 14 pages.
Office action for U.S. Appl. No. 12/636,571, dated Feb. 15, 2017, Miller et al., "Leveraging Concepts With Information Retrieval Techniques and Knowledge Bases", 35 pages.
Final Office Action for U.S. Appl. No. 14/293,673, dated Apr. 25, 2017, Fred A. Brown, "Virtual Assistant Conversations", 32 pages.
Office action for U.S. Appl. No. 13/865,789, dated May 19, 2017, Brown et al., "Virtual Assistant Focused User Interfaces", 22 pages.
Final Office Action for U.S. Appl. No. 13/271,175, dated May 30, 2014, Nova T. Spivack, "System and Method for Providing Distributed Intelligent Assistance", 14 pages.
Office action for U.S. Appl. No. 14/293,619, dated May 4, 2017, Brown et al., "Virtual Assistant Acquisitions and Training", 18 pages.
Office Action for U.S. Appl. No. 12/014,229, dated Jun. 8, 2017, Tanya M. Miller, "Active Lab", 10 pages.
Non-Final Office Action for U.S. Appl. No. 13/271,175, dated Jul. 19, 2013, Nova T Spivack, "System and Method for Providing Distributed Intelligent Assistance", 13 pages.
Office Action for U.S. Appl. No. 14/837,282, dated Oct. 20, 2015, Nova T. Spivack, "System and Method for Providing Distributed Intelligent Assistance", 8 pages.
Krahmer, Emiel et al., "Problem Spotting in Human-Machine Interaction", IPO, Center for Research on User-System Interaction, Sixth European Conference on Speech Communication and Technology, Sep. 5-9, 1999, Budapest, Hungary, 4 pages.
Final Office Action for U.S. Appl. No. 14/451,009, dated May 21, 2015, Fred Brown, "Wearable-Based Virtual Agents", 10 pages.

* cited by examiner

PROVIDING VARIABLE RESPONSES IN A VIRTUAL-ASSISTANT ENVIRONMENT

BACKGROUND

A large and growing population of users accesses information via websites or downloaded client applications provided by respective service providers. Accessing this information "online", rather than in person or over the phone, provides numerous benefits to both the service providers and the end users. For instance, the service providers are able to offer an array of information on their websites for access by end users at any time of day and without the cost associated with providing a human representative to help end users seek desired information. In many instances, this information may be of the type that a human representative of the service provider need not spend time relaying to customers, such as contact information of the service provider (e.g., physical location, phone number, etc.), hours in which the service provider is open, items (e.g., products, services, etc.) offered by the service provider, and the like.

While providing this type of information to end users in this manner is both convenient for users and saves costs for a service provider, the amount of available information can be overwhelming from both a management and an accessibility standpoint. For instance, a user may visit a website of a service provider to seek a particular piece of information or to make a particular request to the service provider. However, because of the massive amount of content and navigation paths offered by the website, the user may find that the desired information is akin to the proverbial needle in the haystack. As such, the user may get frustrated and cease working with the service provider or may call a human representative of the service provider for help, thus eliminating the cost savings associated with providing this information on the website.

To alleviate this problem, service providers may employ a "virtual assistant" to act as an interface between end users and the information on the service provider site. In some instances, this virtual assistant embodies a human representative of the service provider that is displayed on a website, client application, or the like of the service provider. The virtual assistant may also include an interface (e.g., a text box) that allows users to input queries, such as "where are you located?" or "when are you open?" In response to receiving such a query, the service provider or a third party utilizes natural language processing techniques to attempt to identify the contents of the user's query. After identifying these contents, the service provider or the third party identifies a response to provide to the user via the virtual assistant, such as "we are located at 555 N. 5$^{th}$ Street" or "we are open from 9 am to 7 pm today".

Virtual assistants thus act as an effective interface that allows users to seek information they desire while still allowing service providers to realize cost savings associated with providing information online rather than via a human representative. While these virtual assistants are helpful to both end users and service providers, increasing the ability of these virtual assistants to emulate human representatives remains a priority.

SUMMARY

This document describes, in part, techniques for providing virtual assistants that intelligently emulate a representative of a service provider by providing responses to user queries received via the virtual assistants. As described below, these techniques may take the context of a user's query into account both when identifying an intent of a user's query and, thereafter, when identifying an appropriate response to the user's query.

In one example, a virtual assistant is displayed on or adjacent to a site of a service provider for receiving a query from a user. In response to receiving a query, the techniques parse the query to identify one or more concepts expressed therein, while also identifying a context associated with the query. The techniques then map these concepts and the identified context to one of multiple different intents. The techniques may then map this intent to a response to provide to the user, with this response being based at least in part on the context. After identifying the response with reference to the context, the techniques provide the response to the user at least partly via the virtual assistant.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to apparatus(es), system(s), method(s), computer-readable instructions, module(s), algorithms, and/or the like as permitted by the context above and throughout the document.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
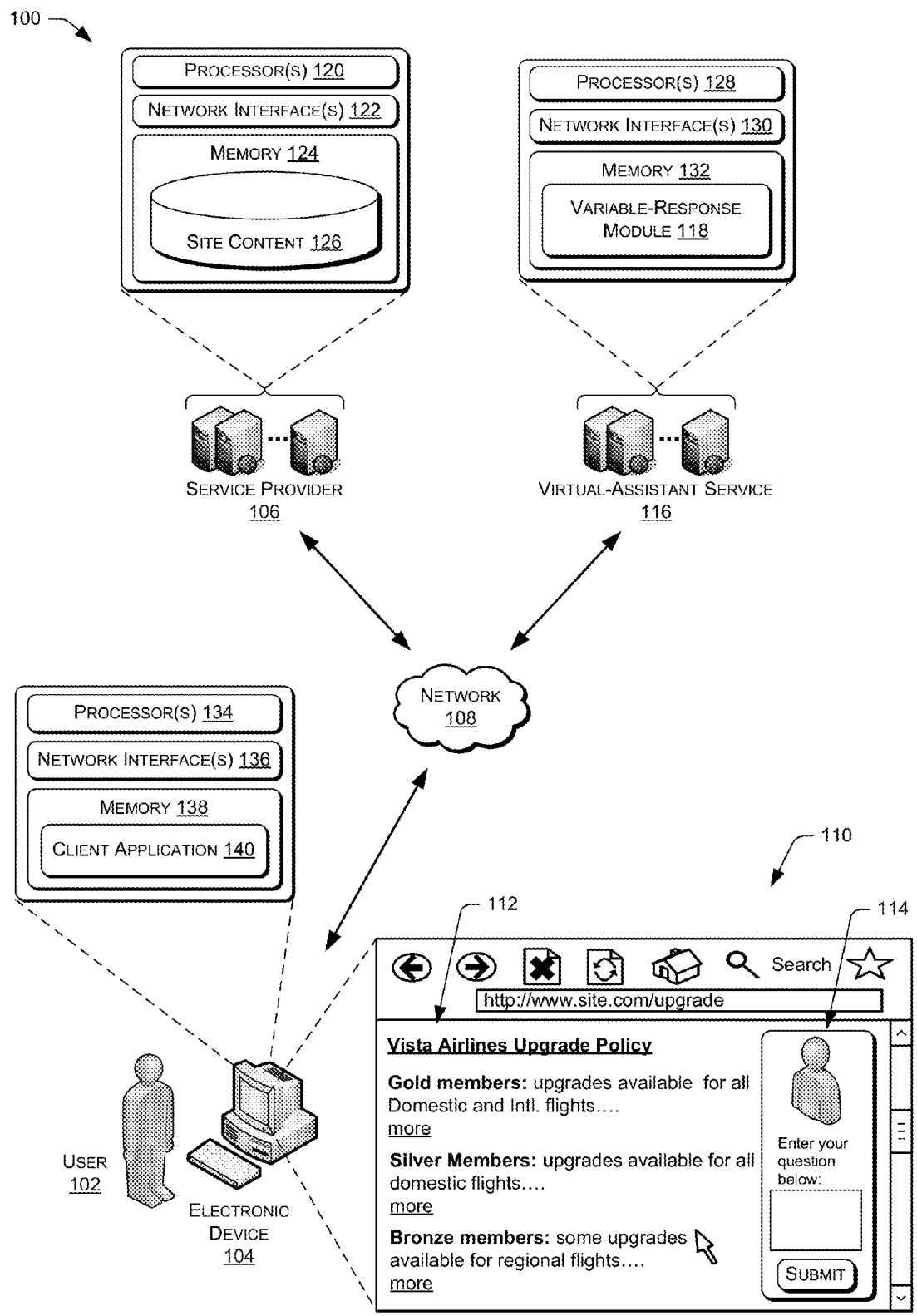
FIG. 1 illustrates an example architecture that includes a user operating an electronic device to render content from a site of a service provider (e.g., a website, a client application, etc.). The architecture also includes a virtual-assistant service that provides a virtual assistant for rendering on or adjacent to the site of the service provider, with this virtual assistant configured to provide variable responses to user queries. These responses may be determined, in part, by mapping a query to an intent based on a context of the query and by mapping the intent to a response, again with reference to the context of the query.

This disclosure describes, in part, techniques for providing variable responses to user queries in a virtual-assistant environment. As described herein, a site of a service provider may utilize a virtual assistant that emulates a human representative of the service provider and that includes an interface for receiving queries (i.e., requests for information) from users of the site. The site may comprise a website, an intranet site, a downloadable client application, or any other type of platform on which the service provider may provide information to electronic devices of users. The service provider, meanwhile, may comprise a merchant, a news organization, an insurance agency, and/or any type of entity that provides items of any sort (e.g., products, digital content, services, etc.) to a user.

In order to identify a variable response (or "reply") to a particular user query, the techniques may take into account a context associated with a query in two different locations. First, the techniques may take into account the context associated with a query when determining the intent or meaning of the user's query. In addition, after identifying the user's intent with use of the context, the techniques may again take this context into account when determining a response or reply to provide back to the user. In some instances, the techniques take the same pieces of context into account when identifying the intent and the response, while in other instances the techniques may take into account different pieces of context. By taking context into account in both locations, the techniques are able to provide responses that more closely emulate human-to-human conversation than when compared to traditional techniques for identifying virtual-assistant responses.

To illustrate, a user may navigate to a site of a service provider that includes a virtual assistant, either on the site or adjacent to the site. The virtual assistant may include an avatar that resembles a human representative of the service provider (e.g., that represents a human face). In addition, the virtual assistant may include an input mechanism, such as a text box, in which a user may input a query. In some instances, the user may type the query, while in other instances the user may issue the query audibly or in any other manner. In either case, the query may comprise a question (e.g., "Can I upgrade my seat assignment on my next flight?") or may simply comprise one or more keywords or a phrase (e.g., "seat assignment upgrades").

In response to receiving the query, the techniques parse the query and utilize natural language processing techniques to identify one or more concepts expressed therein. In one example, the concepts may be based at least in part on keywords within the query, although the concepts may additionally be determined using a richer process as discussed below. In one basic example, these concepts may comprise keywords, such as "upgrade," "seat assignment", "flight", and the like in this example. After identifying the concept(s) expressed in the query, the techniques may identify a context associated with the query. The context associated with the query may include a context associated with the user, a context associated with the user's session on the site of the service provider or the like. In some instances, a context is expressed as a value of one or more variables, such as whether or not a user has signed in with a site (e.g., "is_signed_in=true" or "is_signed_in=false"). A context associated with the query may comprise a value associated with any type of variable that aids in understanding the meaning of a particular query provided by the user. Example, non-limiting pieces of context may include:

whether or not the user has signed in with the site of the service provider (e.g., with a user name and password);

a status of the user with the service provider (e.g., based on miles flown, a type of membership of the user, a type of subscription purchased by the user);

a page of the site from which the user provides the query to the virtual assistant;

how long the user has remained on the page of the site from which the user provides the query to the virtual assistant;

a navigation history of the user during the session prior to the user providing the query to the virtual assistant;

a location of a cursor on the site when the user provides the query to the virtual assistant;

a prior query provided by the user to the virtual assistant during the session or a prior session;

a time of day at which the user provides the query to the virtual assistant;

a date on which the user provides the query to the virtual assistant;

an age of the user;

a location of the user (e.g., a geolocation of the user indicated by the device on which the user provides the query);

a device type from which the user accesses the site (e.g., a mobile device, a desktop computer, etc.);

a language associated with the user (e.g., a language of the query submitted by the user);

how the user interacts with the virtual assistant (e.g., whether the user submits a query textually, using voice input, etc.);

how the interaction with the virtual assistant is initiated (e.g., via user selection of a link or graphic, via the virtual assistant proactively engaging the user, etc.);

past interaction information between the user and the virtual assistant, either during the current session or during previous sessions (e.g., previous queries and responses, etc.)

how the user has been communicating recently (e.g., via text messaging, via email, etc.);

information derived from the user's location (e.g., current, forecasted, or past weather at the location, major sports teams at the location, nearby restaurants, etc.);

current topics of interest, either to the user or generally (e.g., trending microblog or blog topics, current news, recent microblog or blog posts made by the user, etc.).

After identifying one or more pieces of context, such as one or more of those pieces of context listed above, the techniques may map the combination of: (1) the identified concept(s), and (2) the identified piece(s) of context to one of multiple different intents, each of which represents the techniques' best guess as to what exactly the user is asking about.

For instance, if a user provides a query stating "what are your store hours?" and the user is determined to be within one block of a brick-and-mortar location of the service provider, then the techniques may determine that the user's intent is to determine whether or not the store is open for the user to enter at this moment. If, however, the user provides a query of "general store hours" and the user is determined to be in a different city as a brick-and-mortar location of the service provider, then the techniques may determine that the user's intent is to learn about the general store hours throughout the week rather than whether or not the store is open at the instant that the user provides the query. In this example, the techniques may map the received queries to two different intents even though the identified concept (store hours) is the same or very similar.

After mapping the user's query to one of multiple different intents based on both the identified concepts and the context associated with the query, the techniques may then map the intent to one of multiple different responses associated with the intent. Returning to the example of the user within one block of a merchant providing the query "what are your store hours?", recall that the techniques have already mapped this query and surrounding context (e.g., location) to an intent indicating that the user is trying to determine whether or not she is able to enter the store at the instant time. Thereafter, the techniques may take into account the same or a different context of the query when identifying a response to provide to the user.

For instance, envision that the user issues this query at 8:50 pm and the store closes at 9:00 pm. Based on this context and the previously determined intent, the techniques the may provide a response to the user stating "We close in ten minutes! Hurry and come see us!" If, however, the user issues the query at 9:05 pm, then the techniques may provide a response stating "We just missed you! However, we are open tomorrow from 8 am to 9 pm."

In another example, a user's may provide an initial query asking "may I upgrade my seat assignment on my next flight?" In response, the techniques may first map the query to an intent (based on context) and then again reference one or more pieces of context prior to determining a response to the query. For instance, envision that the techniques determine that the value of the variable "is_signed_in" is true and that the value of the variable "Gold_Customer" is also true, meaning that the user is in fact signed in with the service provider and is a "gold customer" at the service provider. In this example, the intent coupled with this context may map to a particular response, which may indicate that the all gold members are entitled to available upgrades. If, however, the value of the variable "Gold_Customer" is false but the value of the variable "Silver_Customer" is true, then the intent coupled with this different context may map to a response indicating that silver customers are entitled to upgrades in certain circumstances.

Furthermore, the techniques could take into account additional context when sending the response, such as a time that the query is received and a time of the user's next flight. If these times indicate that the user's flight is about to take off, then the techniques could use this context to switch the communication channel between the user and virtual assistant. For instance, if the user submits the query via a web interface, but techniques determine that the user's flight is about to take off, then the techniques may send the response via a text message in addition or in the alternative to providing the response via the web interface. The techniques may also take into account past interactions between the user and the virtual assistant, communication channels the user regularly uses, communication channels the user has recently been using, and the like.

As described in detail below, a response provided back to a user may include content and/or action(s). For instance, a response may include content such as a textual answer or information, an audible answer or information, one or more hyperlinks to pages that have been determined to be related to the query, or the like. In some instances, the techniques may provide some or all of this response via the virtual assistant. For instance, the returned content may include text and one or more links that are written as a narrative from the perspective of the virtual assistant. This content may also be addressed to or otherwise tailored to the particular user, if recognized (e.g., "Yes, John, as a Gold Customer you are entitled to a seat upgrade, and I have provided some links below that may be of interest to you . . . "). In addition or in the alternative, the techniques may provide information audibly that appears to originate from the virtual assistant.

Addition or alternatively, the techniques may perform an action on behalf of the user in response to receiving the query, such as causing a user's electronic device to navigate to a page deemed related to the query (e.g., to a page associated with Gold Customer upgrade policies), may alter a reservation or order on behalf of the user (e.g., upgrade the user's seat assignment), may initiate a request on behalf of the user (e.g., request the upgrade), may initiate a communication on behalf of the user, may purchase an item on behalf of the user, or may perform any other similar or different type of action in response to receiving the query.

By taking into account the context of a query both: (1) for the purposes of identifying an intent, and (2) after for the purposes of identifying a response identifying the intent, the techniques described herein allow for interaction between virtual assistants and end users that more closely mirror human-to-human interactions. These techniques are described below with reference to an example architecture. It is to be appreciated, however, that other similar and/or different architectures may also implement these techniques.

Example Architecture

FIG. 1 illustrates an example architecture 100 that includes a user 102 operating an electronic device 104 to render content from a site of a service provider 106. The site may comprise a website, an intranet site, a downloaded application, or any other platform on which the user 102 may access information from the service provider 106. In this example, the user 102 access the site over a network 108, which may represent any type of communication network, including a local-area network, a wide-area network, the Internet, a wireless network, a wireless wide-area network (WWAN), a cable television network, a telephone network, a cellular communications network, combinations of the foregoing, and/or the like.

As illustrated, the device 104 renders a user interface (UI) 110 that includes content 112 from the service provider 106 and content 114 from a virtual-assistant service 116. In some instances, the content 114 may be served from servers of the service provider 106 as part of the site, while in other instances the content 114 may be from servers of the virtual-assistant service 116 served atop or adjacent to the site. In either instance, the content 112 of the site may include any sort of details or information associated with the service provider 106, while the content 114 may include a virtual assistant (e.g., an avatar that resembles a human representative of the service provider 106) along with an interface that allows the user 102 to enter a query to the virtual assistant.

As described in further detail below, the user 102 may enter a query into the interface provided by the virtual assistant. In response to receiving this query either from the computing device 104, from the service provider 106, or in some other manner, a variable-response module 118 of the virtual-assistant service 116 may identify a response to provide to the user 102 at least partly via the virtual assistant. For instance, the variable-response module 118 may map the query to an intent based on a context of the query and may then map the intent to a response, again with reference to the context of the query. After identifying the response, the virtual-assistant service 116 and/or the service provider 106 may provide the response to the user 102.

As illustrated, the service provider 106 may comprise one or more computing devices (e.g., one or more servers) that include or otherwise have access to one or more processors 120, one or more network interfaces 122, and memory 124, which stores content 126 of the site of the service provider 106. The virtual-assistant service 116, meanwhile, may also comprise one or more computing devices (e.g., one or more servers) that include or otherwise have access to one or more processors 128, one or more network interfaces 130, and memory 132, which stores the variable-response module 118.

Finally, the electronic device 104 of the user 102 may include or otherwise have access to one or more processors 134, one or more network interfaces 136, and memory 138, which stores a client application 140 for rendering the UI 110. The client application may comprise a browser for rendering the site content 126, a downloaded application provided by the service provider 106, or any other client application configured to output content from the service provider 106. While FIG. 1 illustrates the service provider 106 storing the site content 126, in some instances the client application 140 may store some or all of this content locally on the device 104.

Furthermore, while FIG. 1 illustrates the electronic device 104 as a desktop computer, the electronic device 104 may comprise any sort of device, such as a mobile phone, a multifunctional device, a laptop computer, a personal digital assistant (PDA), or the like. In each instance, the electronic device 104 may include various additional components, such as one or more output devices (e.g., displays, speakers, etc.), one or more input devices (e.g., a keyboard, a touch-screen, etc.), an operating system, system busses, and the like.

The memory 138 (and other memories described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

While FIG. 1 illustrates one example architecture for providing variable responses, it is to be appreciated that multiple other architectures may implement the described techniques. For instance, while FIG. 1 illustrates the service provider 106 as separate from the virtual-assistant service 116, in some instances some or all of these components may reside in a common location, spread out amongst multiple additional entities, located on the electronic device 104, and/or the like.

Example Variable Responses

Figure 2A:
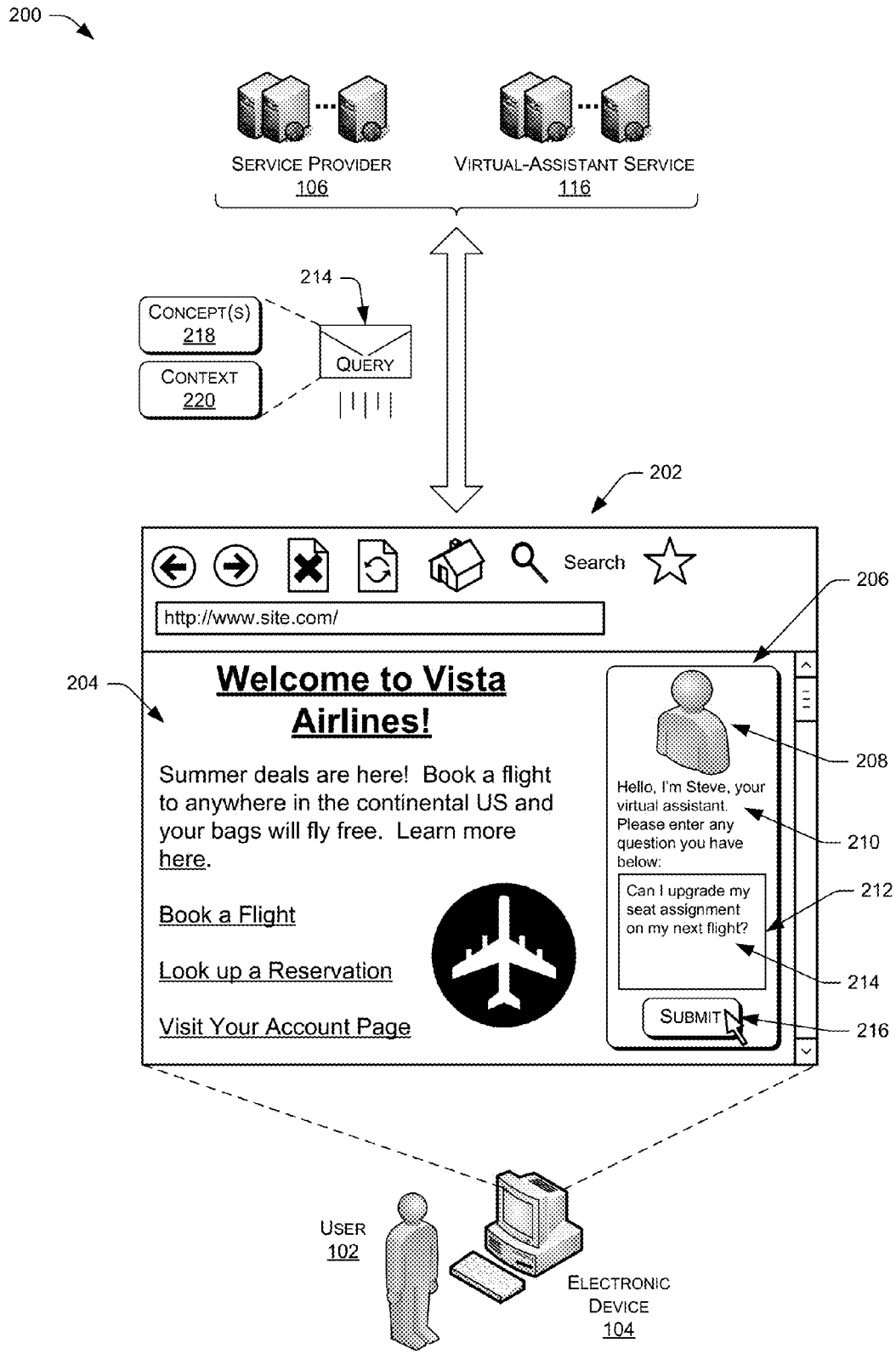
FIGS. 2A-B collectively illustrate a high-level communication flow between an electronic device of the user and the service provider and/or the virtual-assistant service. Here, a user provides a query via the virtual assistant and, in response, the service provider and/or the virtual-assistant service provides a variable response for output on the electronic device of the user.
Figure 2B:
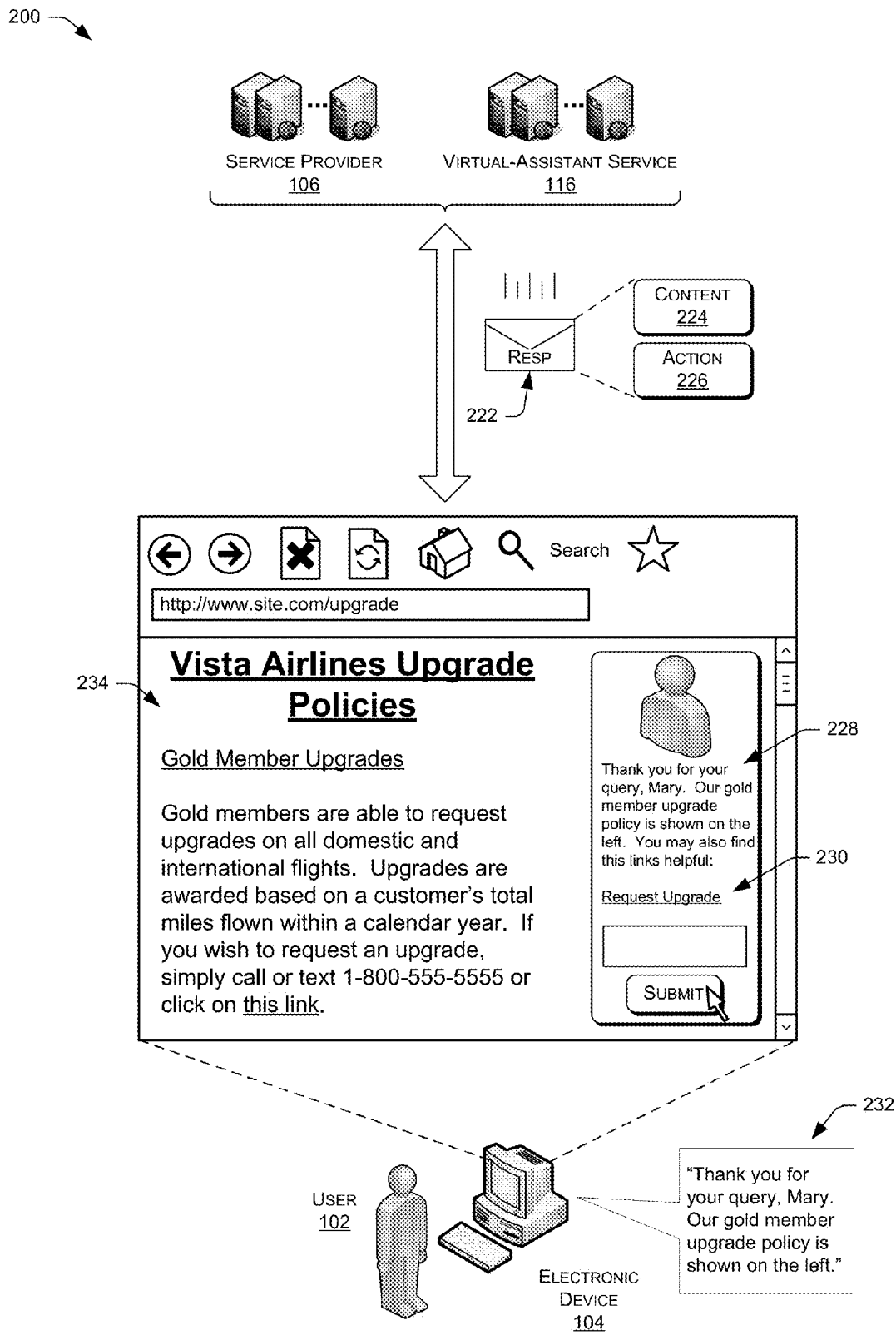

FIGS. 2A-B collectively illustrate a high-level communication flow 200 between the example electronic device 104 of the user 102 and the service provider 106 and/or the virtual-assistant service 116. As illustrated, the electronic device 104 renders a user interface (UI) 202 that includes content 204 from the service provider 106 and content 206 from the virtual-assistant service 116. In some instances, the virtual-assistant service 116 serves the content 206 to the device 104, while in other instances the service provider 106 serves the content 206, either as part of the site content 204 or after receiving the content from a separate virtual-assistant service 116.

In either instance, the example content 204 here represents a home page of an example service provider ("Vista Airlines"). The content includes a title of the page, a link to current promotions, a link to book a flight, and the like. The content 206, meanwhile, collectively comprises a virtual assistant that is configured to emulate human-to-human interaction between the example user 102 and the service provider 106. In this example, the content 206 includes an avatar 208 that depicts a human representative of the service provider, as well as text 210 introducing the avatar 208 as a virtual assistant ("Hello, I'm Steve your virtual assistant. Please enter any question you have below:").

The content 206 also includes an input mechanism, here in the form of a text box 212, in which the user 102 is able to enter a query to the virtual assistant. In this example, the user 102 has entered the query in the form of a string of text 214 ("Can I upgrade my seat assignment on my next flight?"). The user 102 may enter this query via a keyboard, audibly, or in any other manner. Finally, the example content 206 includes an icon 216 ("Submit") that, when selected, allows the user 102 to submit the query to the service provider 106 and/or the virtual-assistant service 116.

As illustrated, the user 102 has in fact selected the icon 216 to submit the entered query to the provider 106 and/or the service 116. In some instances, the device 104 provides the query 214 directly to the service provider 106, which identifies an appropriate response and may provide this response back to the device 104 or to another device associated with the user. In other instances, meanwhile, the provider 106 may receive the query 214, provide the query 214 to the service 116, receive a response from the service 116, and provide the response to the device 104 or to another device associated with the user. In still other instances, the device 104 provides the query 214 to the service 116 directly, which may identify a response or provide the query 214 to the provider 106 for identifying a response. The service 116 or the provider 106 may then provide the response to the device 104 or to another device associated with the user. Of course, while a few example communication flows have been described, it is to be appreciated that other communication flows are possible.

In each instance, the query 214 sent to the provider 106 and/or the service 116 may comprise one or more concepts 218 and one or more pieces of context 220. The concepts 218 may be based, in part, on the words and phrases within the string of text entered by the user, while the context 220 may be based on any additional factors associated with the user, the device 104, or the like. As described above, for instance, the context 220 may include whether or not the user is signed in with the service provider 106, a status of the user 102 with the service provider, an age of the user 102, a type of device from which the user 102 provides the query 214, or the like.

FIG. 2B continues the illustration and represents the service provider 106 and/or the virtual-assistant service 116 providing a response 222 for output on the electronic device 104 or on another electronic device associated with the user 102. As described above and in further detail below, the provider 106 and/or the service 116 may have identified the response by first mapping the concepts 218 and the context 220 to an intent, and thereafter mapping the intent and the context 220 to the response 222. As illustrated, the response 222 may comprise content 224, one or more actions 226 to perform, or a combination thereof.

FIG. 2B, for instance, illustrates that the response 222 includes text 228, a hyperlink 230, and audio content 232. The text 228 may comprise an answer or information otherwise pertaining to the user's query 214. Here, for example, the text 228 states the following: "Thank you for your query, Mary. Our gold member upgrade policy is shown on the left. You may also find this link helpful:". As such, the provider 106 and/or the service 116 may have determined, via the context 220, that the user 102 was in fact signed with the service provider 106 when the user 102 submitted the query 214 and that the user 102 ("Mary") has a status of "gold member" with the service provider 106.

In addition, the response 222 included the link (e.g., a hyperlink) 230 associated with the query and entitled "Request Upgrade". When the user 102 selects the link 230, the electronic device 104 may navigate to a page at which the user 102 may request to upgrade her seat on her next flight. The audio content 232, meanwhile, may comprise the same content as the text 228, or may comprise different content in other examples. In some instances, the avatar (i.e., the visual representation of the virtual assistant) may appear to utter the audible content 232, either based on the tone of the content 232 and/or based on the avatar appearing to speak the words within the content 232.

In addition, the response 222 may include one or more actions 226 for performance on behalf of the user 102. Here, for instance, the response 222 has instructed the device 104 to navigate to a new page 234 of the site of the content provider, with this page being associated with the query 214. In this example, the page 234 indicates the service provider's policy for upgrading gold members, like the user 102. In other instances, the action 226 may comprise automatically upgrading the user's seat assignment, initiating a request to upgrade, or the like.

Figure 3A:
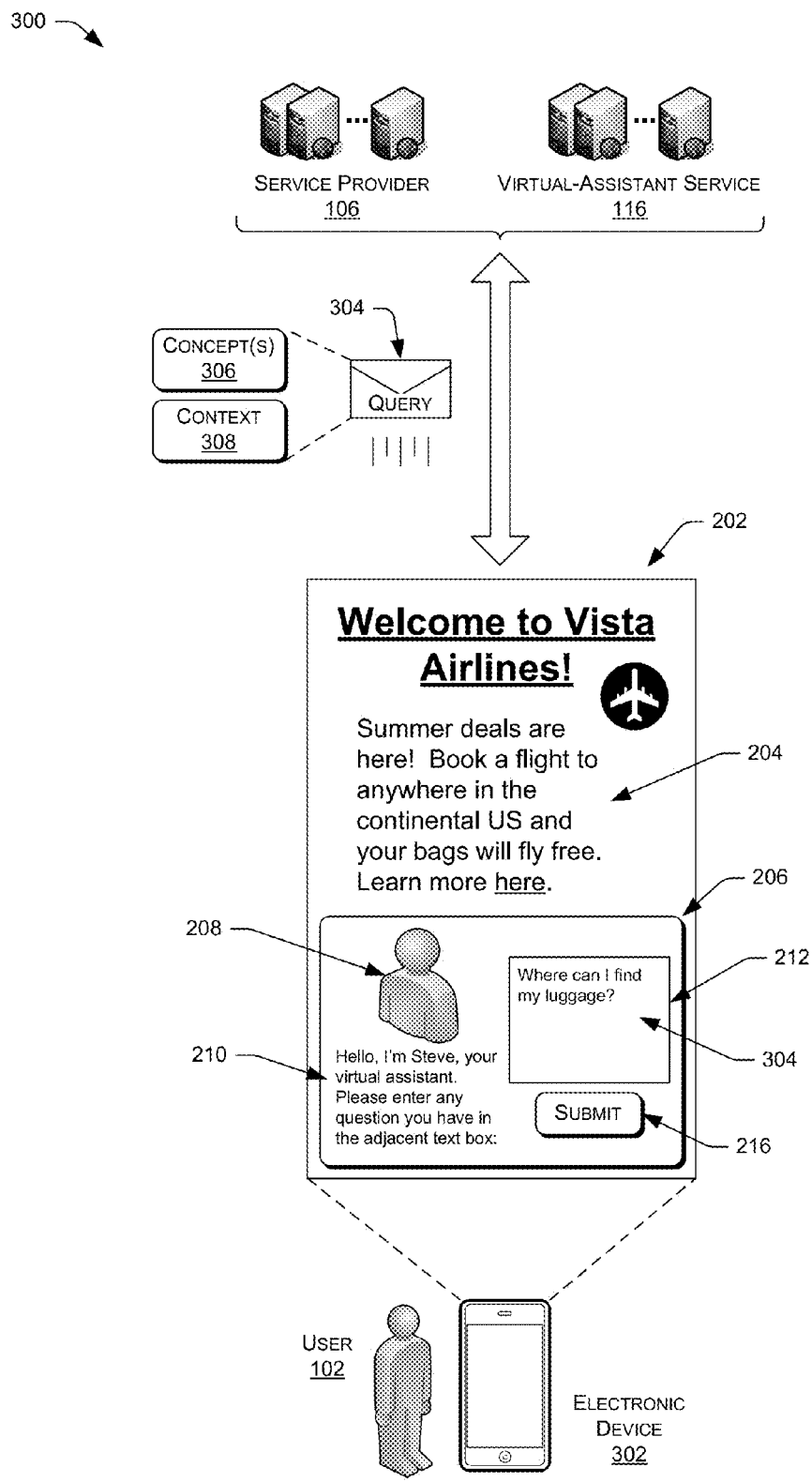
FIGS. 3A-B collectively illustrate another high-level communication flow between a mobile electronic device of the user and the service provider and/or the virtual-assistant service. Here, the user again provides a query via the virtual assistant and, in response, the service provider and/or the virtual-assistant service provides a variable response for output on the electronic device of the user.
Figure 3B:
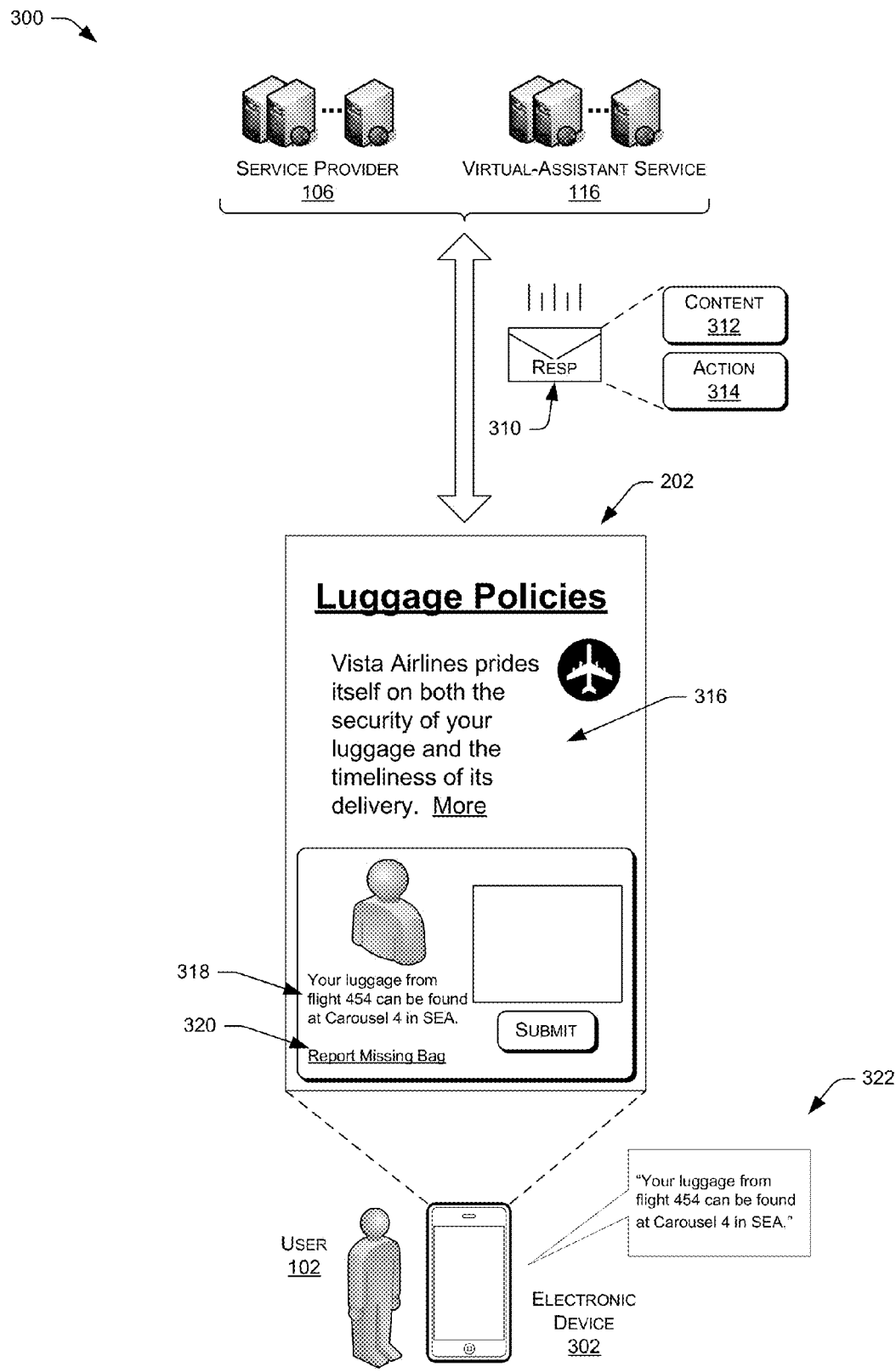

FIGS. 3A-B collectively illustrate another high-level communication flow 300 between a mobile electronic device 302 of the user 102 and the service provider 106 and/or the virtual-assistant service 116. Here, the user 102 again provides a query 304 via the virtual assistant, with the query including one or more concepts 306 and one or more pieces of context 308. In this example, the query comprises the string of text "Where can I find my luggage?". For instance, the user 102 may have recently deplaned from a flight on Vista airlines and, hence, may be providing the query 304 to the provider 106 and/or the service 116 while physically located near a particular airport. In another example, the user may be making this request from her home and prior to actually making the flight. In either instance, the query 304 may include this context in the form of the geolocation of the mobile electronic device 302 when the user issued the query. This geolocation may be provided explicitly by the device 302 (e.g., via GPS coordinates, etc.), may be determined via signal triangulation, or may be determined in any other manner.

FIG. 3B illustrates that, upon receiving the query 304, the service provider 106 and/or the virtual-assistant service 116 may identify a response 310 to provide to the user 102. Again, this response may be determined by identifying an intent of the query 304 with reference to the concepts 306 and one or more pieces of the context 308, and then by mapping the determined intent along with one or more same or different pieces of the context 308 to the response 310.

As with the example of FIGS. 2A-B above, the response 310 may comprise content 312 and/or action 314. In this example, the action 314 includes navigating the user's electronic device 302 to a page 316 of the service provider's site that indicates Vista Airlines' luggage policies. The content 312, meanwhile, includes text 318 indicating that the luggage of the user 102 can be found at carousel four at the airport at which the user 102 landed (SEA). To make this determination, the provider 106 and/or the service 116 may have identified the user 102, her now-completed travel plans, her geolocation, and/or one or more other pieces of context prior to serving the text 318 for output on the device 302. If the user were to have issued the query from her home and prior to her flight, the provider 106 and/or the service 116 may have taken this different context (e.g., a different geolocation, a different time of the query, etc.) into account and may have served different content.

In this example, the content 312 of the response 310 also includes a hyperlink 320 ("Report a Missing Bag") that is related to the query 304 of the user 102. Finally, in this example, the content 312 also includes audible content 322 for output by the virtual assistant. Again, while this audible content 322 is the same as the text 318 in this example, in other examples these pieces of content differ from one another.

Example Virtual-Assistant Service

Figure 4:
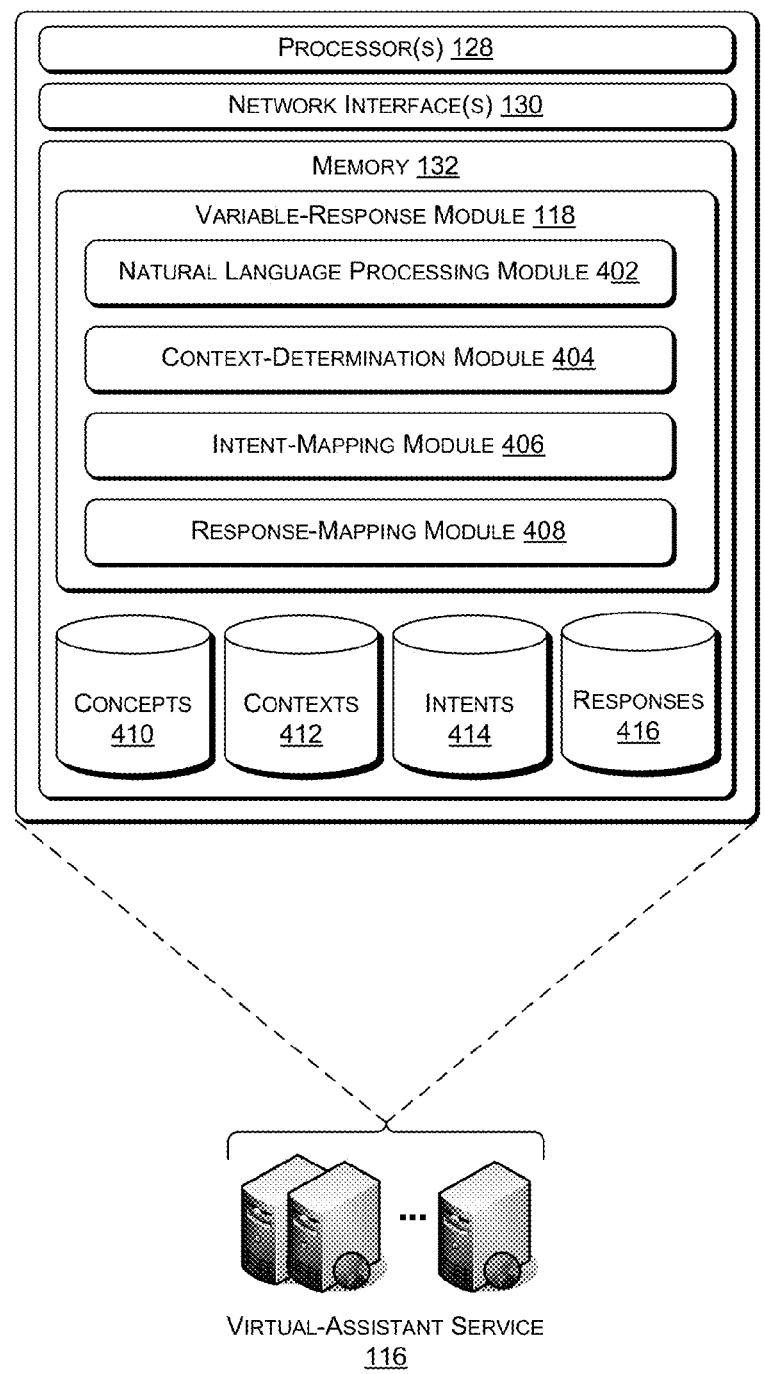
FIG. 4 illustrates example components that the virtual-assistant service of FIG. 1 may utilize when identifying a variable response to provide to a user query.

FIG. 4 illustrates example components that the virtual-assistant service 116 may utilize when identifying a variable response to provide to a user's query. As illustrated, the service 116 may be hosted on one or more servers that include one or more processors 128, one or more network interfaces 130, and memory 132.

The memory 132 may store or otherwise have access to the variable-response module 118, which may include a natural language processing module 402, a context-determination module 404, an intent-mapping module 406, and a response-mapping module 408. In addition, the memory 132 may also store or otherwise have access to a datastore of one or more concepts 410, a datastore of one or more contexts 412, a datastore of one or more intents 414, and a datastore of one or more responses 416.

The natural language processing module 402 may implement known or new natural language processing techniques to parse a received query for the purpose of identifying one or more concepts expressed therein. For instance, the module 402 may identify a set of concepts 410 based on the string of text of the query. The context-determination module 404, meanwhile, may function to identify one or more pieces of context associated with the received query, such as whether the user is signed in, a geolocation of the user when issuing the query, or the like. The intent-mapping module 406 may then map the identified set of concepts and the identified pieces of context to one of the multiple different intents 414. That is, given the union of a particular concept set and respective values of one or more variables associated with the context of the query, the module 406 may map the query to a particular intent of the intents 414.

Finally, the response-mapping module 408 may map the intent to a particular response based at least in part on respective values of one or more variables, which may be the same or different variables used when mapping the query to an intent. Stated otherwise, and as illustrated below with reference to FIG. 5, each intent of the intents 414 may be associated with multiple different responses. Therefore, after a particular query has been mapped to a particular intent, the response-mapping module 408 may identify which of the multiple responses associated with the intent to provide to the user who provided the query, with reference to the context of the query.

While FIG. 4 illustrates the described components as residing on the virtual-assistant service 116, in other instances some or all of these components may reside in another location. For instance, these components may reside across the service 116, the service provider 106, the electronic device 104 or 302, or at any other location.

Figure 5:
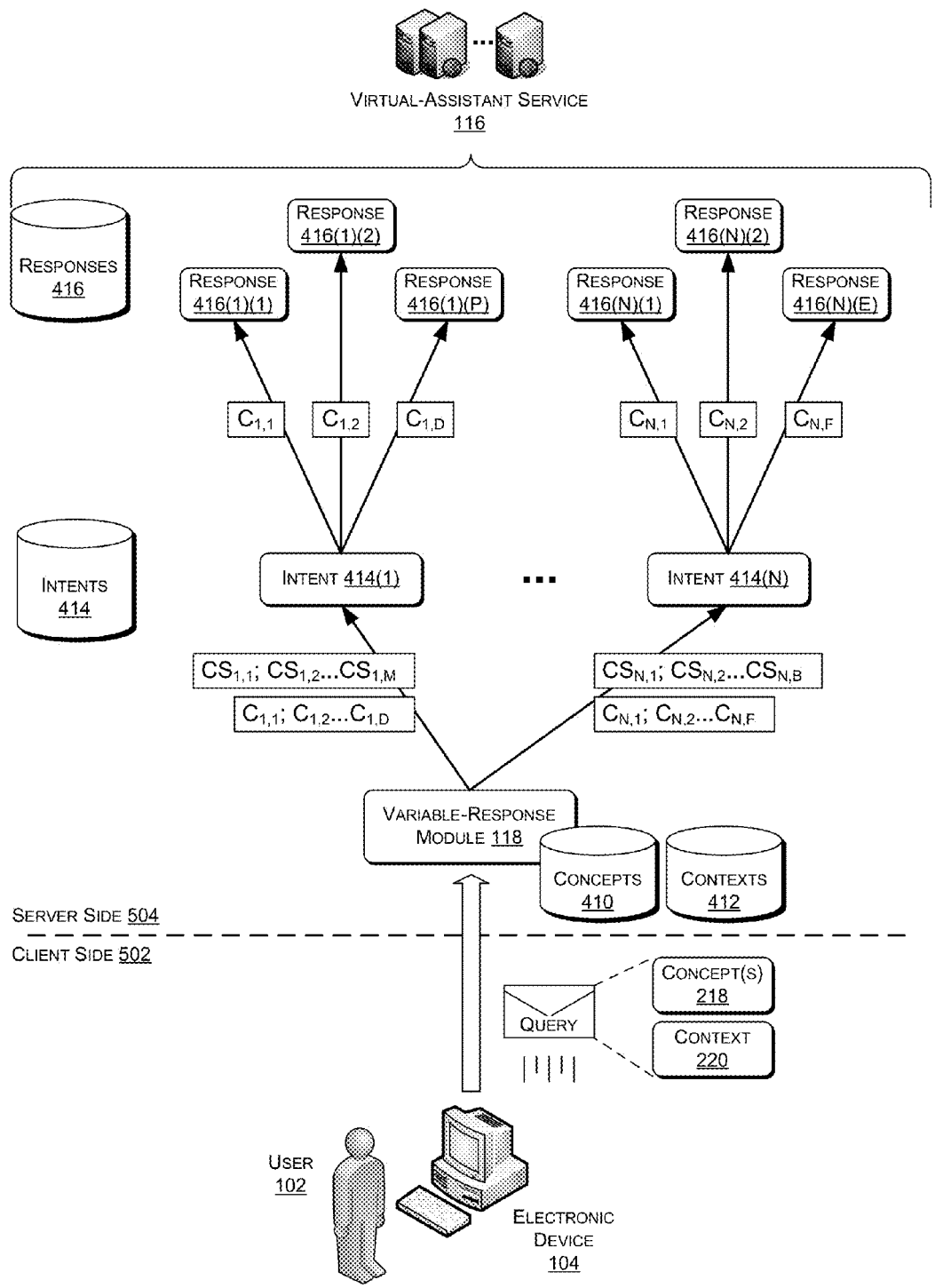
FIG. 5 illustrates how the virtual-assistant service may identify a response to provide to a user in response to receiving a query from the user via a virtual assistant. As illustrated, the service may first map the query to a particular intent with reference to both concepts expressed in the query and a context associated with the query. After mapping the query to an intent, the service may then map the intent to an appropriate response with reference to the context of the query.

FIG. 5 illustrates how the virtual-assistant service 116 may identify a response to provide to the example user 102 in response to receiving a query from the user 102 via a virtual assistant. In this example, the query is provided from the user on a client side 502 of the illustration, while the identifying of a response to provide to the query is illustrated as being performed on a server side 504 of the illustration. Of course, in other implementations different portions of the operations may be performed at other locations.

As FIG. 5 depicts, the example query again includes one or more concepts 218 and one or more pieces of context 220. Upon receiving the query, the variable-response module 118 may identify, potentially with reference to the datastores 410 and 412, the concepts and context of the query. Based on the identified set of concepts of the query (or "concept set") and the identified pieces of context of the query (or "context"), the module 118 may map the query to one of multiple different intents 414(1), . . . , 414(N). For instance, FIG. 5 illustrates that a query having a concept set "$CS_{1,1}$" and a context "$C_{1,1}$" maps to the intent 414(1), while a query having a concept set "$CS_{N,1}$" and a content "$C_{N,1}$" maps to the intent 414(N). In some instances, a concept set may map to more than one intent and, therefore, the context of the query may be used to determine which intent to map the query to. That is, in instances where a concept set of a query maps to multiple different intents, the intents may compete for the query based on the context of the query. As used herein, a letter (e.g., "N", "E", etc.) represents any integer that is greater than zero.

After mapping the query to an intent, the variable-response module 118 may then map the intent to an appropriate response 416(1)(1), . . . , 416(N)(E) with reference to the context of the query. For instance, for a query that the module 118 has mapped to the intent 414(1) and that has a content "$C_{1,1}$", the module 118 maps this query to a response 416(1)(1). In some instances, of course, a response may be common (or utilized) across multiple different intents. After identifying the response based on the context, the virtual-assistant service 116 may then provide this response to the user 102, such as directly to the device 104 or to the service provider 106 for providing to the device 104 (and/or to another device associated with the user).

Figure 6A:
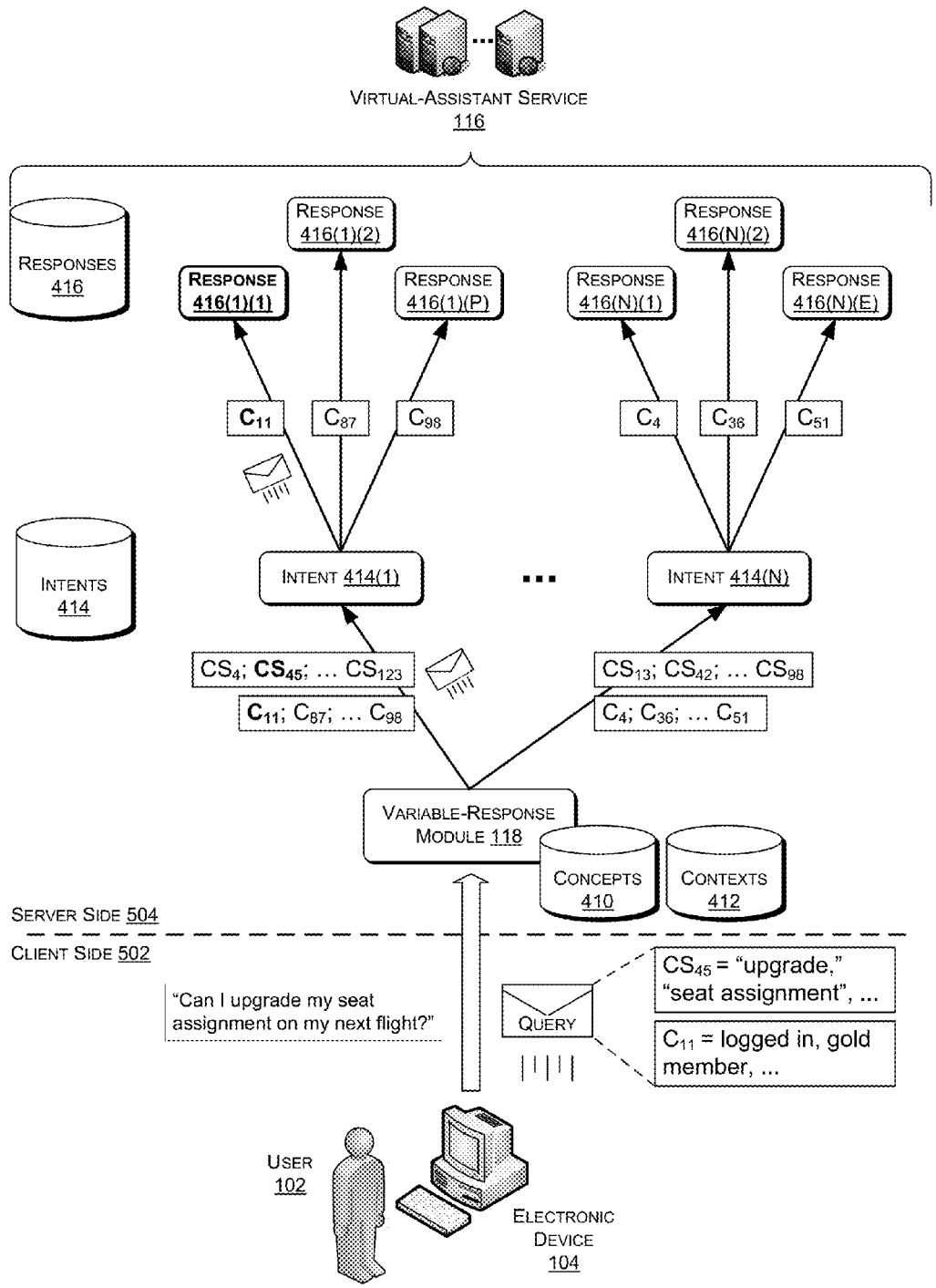
FIGS. 6A-B collectively illustrate an example of mapping a particular query ("Can I upgrade my seat assignment on my next flight?") to a particular response by referencing a context of the query both when mapping the query to an intent and when mapping the intent to a response. As illustrated, the response may include both content (e.g., plain text, links, audio, etc.) and an action (e.g., navigating the user's electronic device to a new page of the site).
Figure 6B:
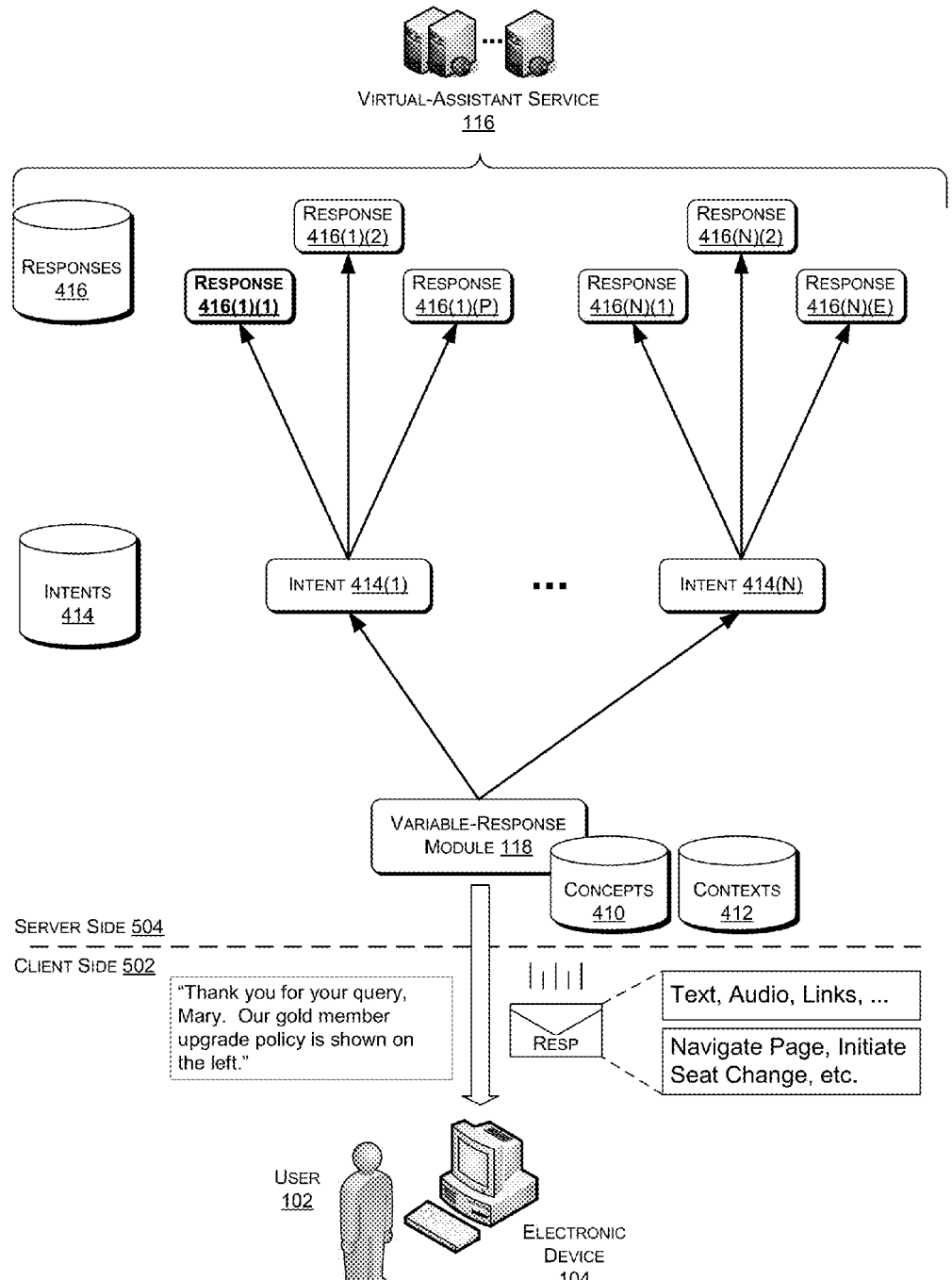

FIGS. 6A-B collectively illustrate an example of mapping a particular query ("Can I upgrade my seat assignment on my next flight?") to a particular response by referencing a context of the query both when mapping the query to an intent and when mapping the intent to a response. In this example, the user inputs the query, which comprises a particular concept set ("$CS_{45}$") and a particular context ("$C_{87}$"). In response to receiving the query and identifying the concept set and context, the variable-response module 118 has mapped the query to the example intent 414(1). Thereafter, the module 118 has mapped this intent to the example response 416(1)(1) based on the identified context of the query.

FIG. 6B continues the illustration, and represents the virtual-assistant service 116 providing the example response 416(1)(1) to the electronic device 104. As illustrated, the response may include both content (e.g., text, links, audio, etc.) and an action (e.g., navigating the user's electronic device to a new page of the site), as described above with reference to FIG. 2B.

Example Processes

Figure 7A:
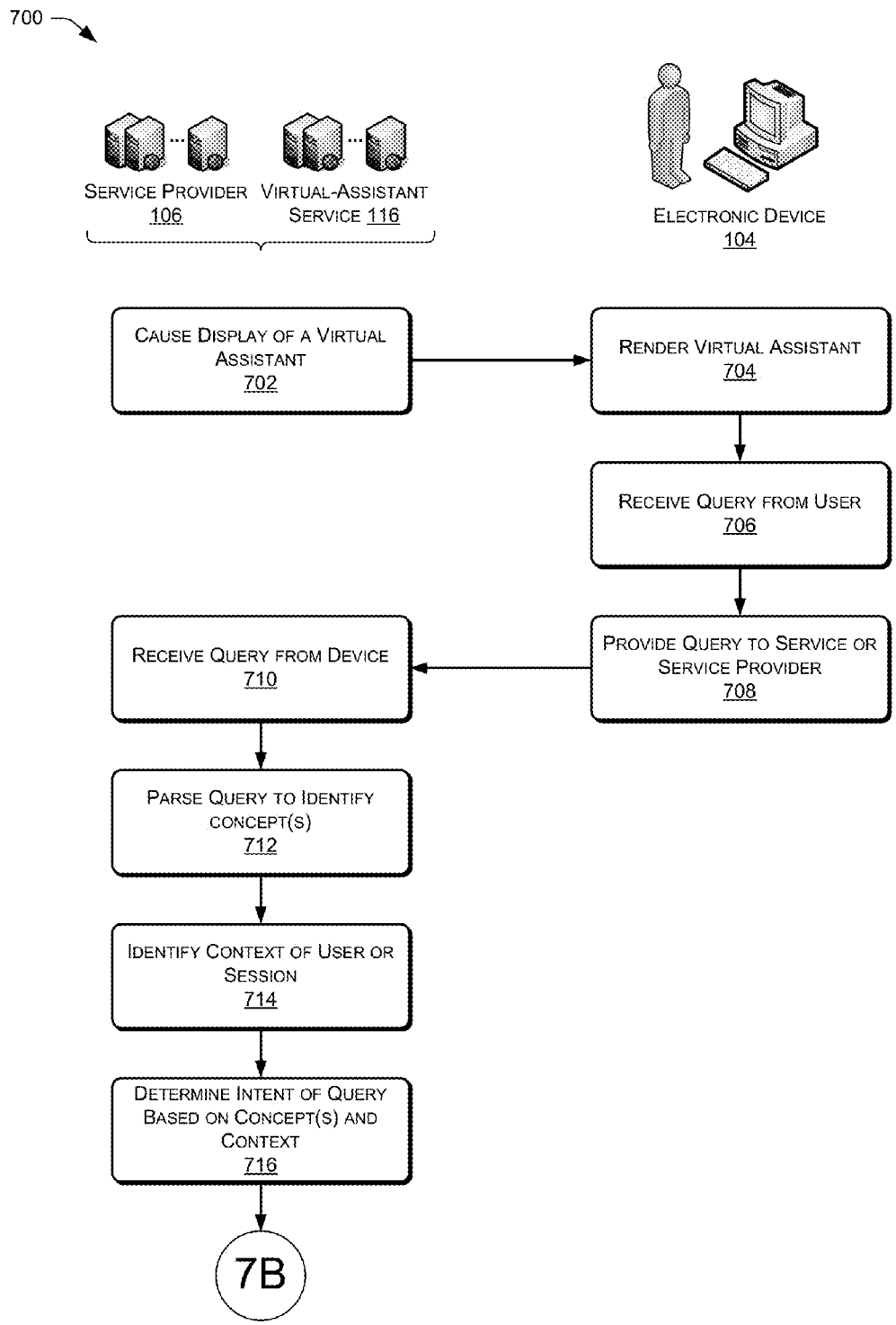
FIGS. 7A-B collectively illustrate an example process that includes a user providing a query via a virtual assistant and the service provider and/or the virtual-assistant service identifying a response to provide to the user. Consistent with the discussion above, this response may take a context of the query into account both when identifying an intent of the query and when identifying an appropriate response.
Figure 7B:
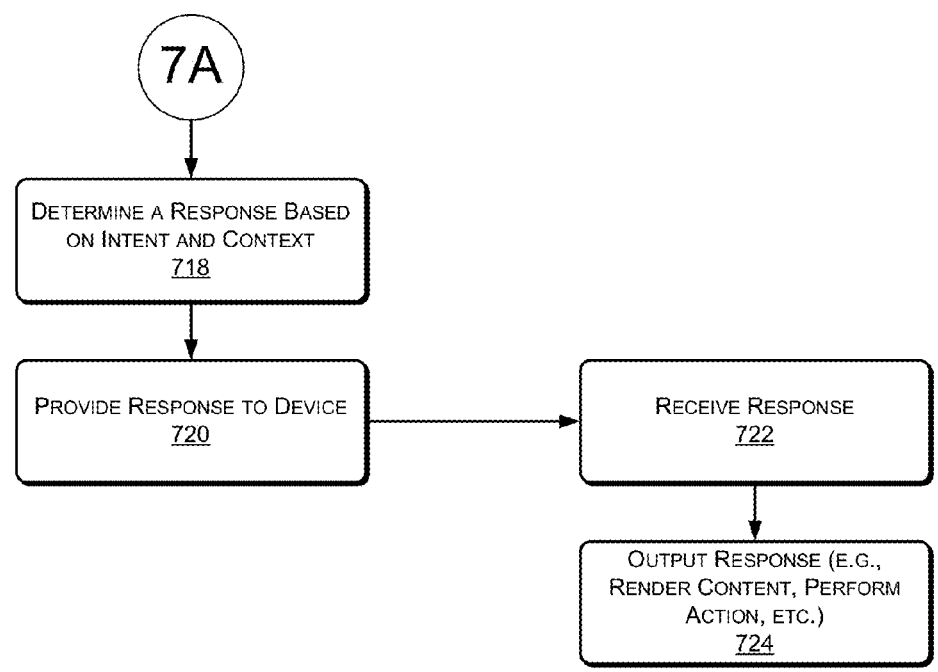

FIGS. 7A-B collectively illustrate an example process 700 that includes the example user 102 providing a query via a virtual assistant and the service provider 106 and/or the virtual-assistant service 116 identifying a response to provide to the user 102. Consistent with the discussion above, this response may take a context of the query into account both when identifying an intent of the query and when identifying an appropriate response. In this example, operations illustrated beneath the electronic device 104 may be performed by this device in some examples, while operations illustrated beneath the provider 106 and the service 116 may be performed by the provider and/or the service in some examples. However, it is to be appreciated that in other implementations the operations may be performed at any other location(s).

The process 700 (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 702, the service provider 106 and/or the virtual-assistant service 116 causes display of a virtual assistant on or adjacent to a site of service provider rendered on a display of the electronic device. At 704, and in response, the device 104 renders the virtual assistant on the display. At 706, the device 104 receives a query from the user, which may comprise a string of text. At 708, the device 104 provides this query to the provider 106 and/or the service 116, which receives the query at 710.

At 712, the provider 106 and/or the service 116 parses the query to identify one or more concepts expressed therein. That is, the provider 106 and/or the service 116 may use natural language processing techniques to identify concepts specified by the user in the query. These concepts may be determined with reference to contents of the user's query in any suitable manner. In some examples, the concept(s) of a query are determined at least partly with reference to one or more keywords expressed within the query. For instance, the concepts may be determined using relatively basic keyword matching in some instances. In other instances, meanwhile, the concepts may be determined using a much richer process as described below.

In these instances, when the provider 106 and/or the service 116 receives the query in the form of a string of text, the provider 106 and/or the service 116 preprocesses the string by, for example, identifying one or more tokens within the string. The tokens may comprise words, phrases, symbols, or the like that signify some sort of meaning within the query. After tokenizing the string of text, the provider 106 and/or the service 116 may then map each of these tokens and/or ordered patterns of the tokens to a more general set, known as a "vocab item". A vocab item may comprise a general set of multiple different tokens having a meaning that is common amongst these tokens. For instance, the tokens "happy", "elated" and a smiley face (e.g., ":-)") may each map to a vocab item representing "happiness".

After mapping tokens and/or patterns of tokens from the original string of text to one or more vocab items, the provider 106 and/or the service 116 may then pattern match the vocab items to one or more concepts. That is, each concept may be associated with multiple different vocab-item patterns (e.g., "(vocab item A, vocab item, D, vocab item F)", "(vocab item B, vocab item E)", "(vocab item X)", etc.). In addition, some of these patterns may be associated with a context. For instance, the pattern "(vocab item B, vocab item E)" may map to a particular concept given a particular context (e.g., the user is a Gold Member), but not otherwise. By pattern matching the vocab items to the concepts, the provider 106 and/or the service 116 may identify one or more concepts that are associated with the submitted query.

In addition or in the alternative to the techniques described above, the provider 106 and/or the service 116 may identify concept(s) of a query with reference to a graph data structure that maintains correlations between words. The graph data structure, for instance, may maintain a hierarchy of words (e.g., hypernyms and hyponyms). The techniques may utilize this hierarchy to identify one or more concepts within a string of text. For instance, if a string contains the word "cookbook", the techniques may analyze the graph data structure to determine that "cookbook" is a type of a "reference book" which is a type of "book". The techniques may then identify "book", "reference book", and/or "book" as a concept within the query. Of course, in this and other processes used to determine concepts within queries, the techniques may reference other factors associated with the queries, such as the ordering of words, parts of speech of words, and the like. Furthermore, while a few different example techniques for identifying concepts have been described, it is to be appreciated that other new and/or known techniques may be used to identify concepts within a query.

At 714, the provider 106 and/or the service 116 may also identify a context associated with the user 102 or with a session of the user 102 on the site of the service provider 106. This may include whether the user is logged in on the site, a page from which the user submitted the query, a status of the user at the service provider 106, or the like. At 716, the provider 106 and/or the service 116 then determines an intent of the query based on the identified concept(s) and the identified context.

FIG. 7B continues the illustration of the process 700 and includes, at 718, the provider 106 and/or the service 116 determining a response to provide to the query based on the intent and the identified context. In some instances, the portion of the context referenced in mapping the query to the intent represents the same portion of context referenced in mapping the intent to the response. In other instances, meanwhile, the provider 106 and/or the service 116 map the query to an intent using a first portion of context, while using a second, different portion of the context when mapping the intent to the response. Of course, in still other instances, these portions of content may include at least one common piece of context and at least one piece of context that is not commonly used.

At 720, the provider 106 and/or the service 116 provides the response to the electronic device 104 of the user or to another electronic device associated with the user. In this example, the device 104 receives the response at 722 and, at 724, outputs the response to the user 102, at least a portion of which may be outputted via the virtual assistant. For instance, the device 104 may render text, one or more links, audible content, and the like, and may perform one or more actions specified in the response.

Figure 8:
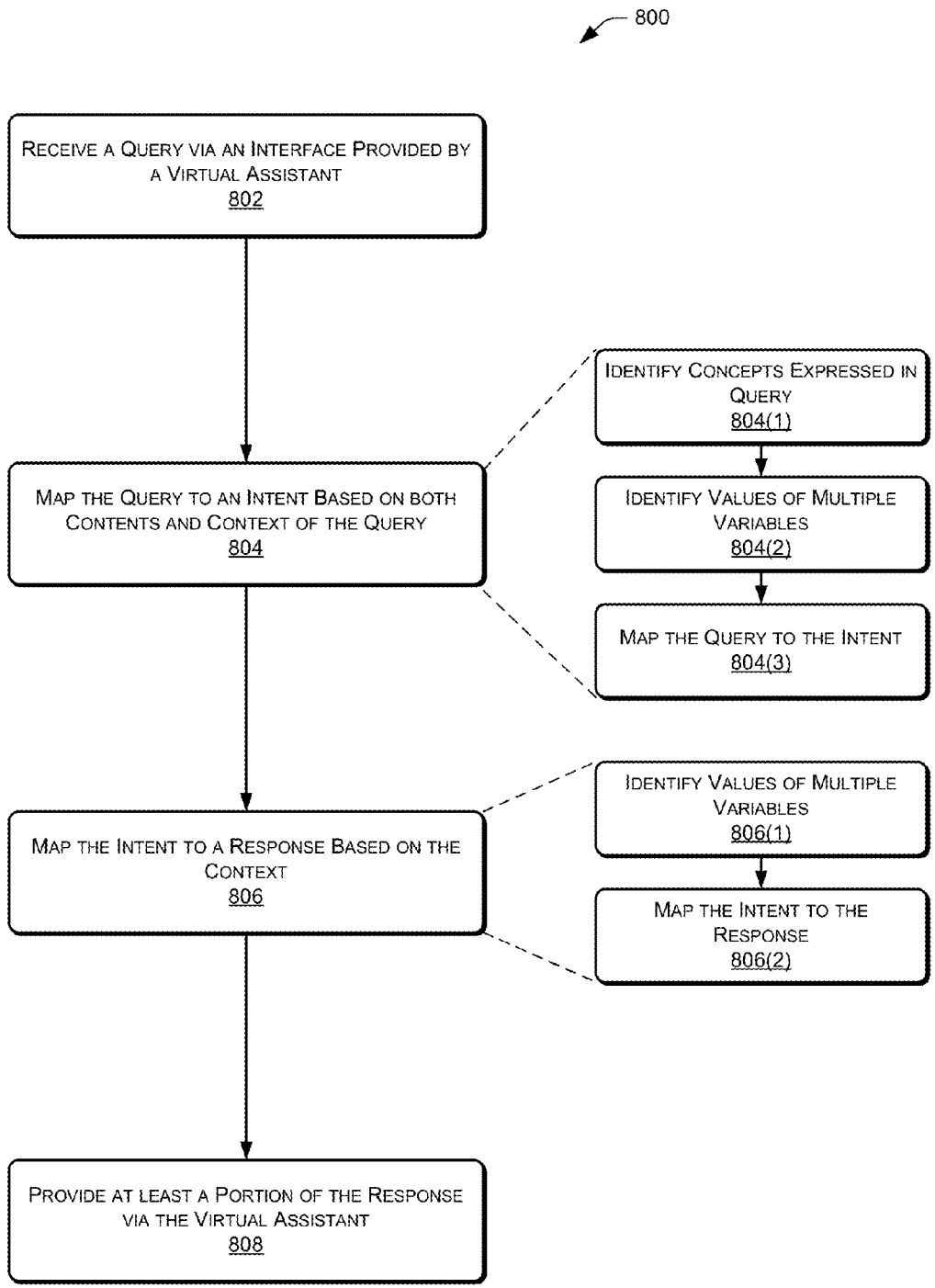
FIGS. 8-9 illustrate additional example flow diagrams for providing variable responses to user queries via virtual assistants.

FIG. 8 illustrates another process 800 for providing variable responses to user queries via virtual assistants. This process may be performed by the virtual-assistant service 116, the service provider 106, the electronic device 104 of the user, and/or some combination thereof. At 802, the process 800 receives a query via an interface provided by a virtual assistant. At 804, the process 800 then maps the query to an intent based on both contents of the query and a context of the query.

In some instances, the operation 804 may comprise a series of sub-operations. At 804(1), the process 800 identifies one or more concepts expressed in the query. At 804(2), the process identifies respective values of multiple different variables that may collectively define the context of the query. Finally, at 804(3), the process 800 maps the query to the intent with reference to the concepts and the values of the multiple variables.

At 806, the process 800 then maps the intent to a response based on the context of the query. The operation 806 may include a series of sub-operations that include, at 806(1), the process 800 identifying values of multiple variables, which may be the same and/or different from the variables used in mapping the query to the intent at 804(3). At 806(2), the process 800 then maps the intent to the response based at least in part on the values of the variables identified at 806(1). Finally, at 808, the process 800 may provide at least a portion of the response to the user via the virtual assistant.

Figure 9:
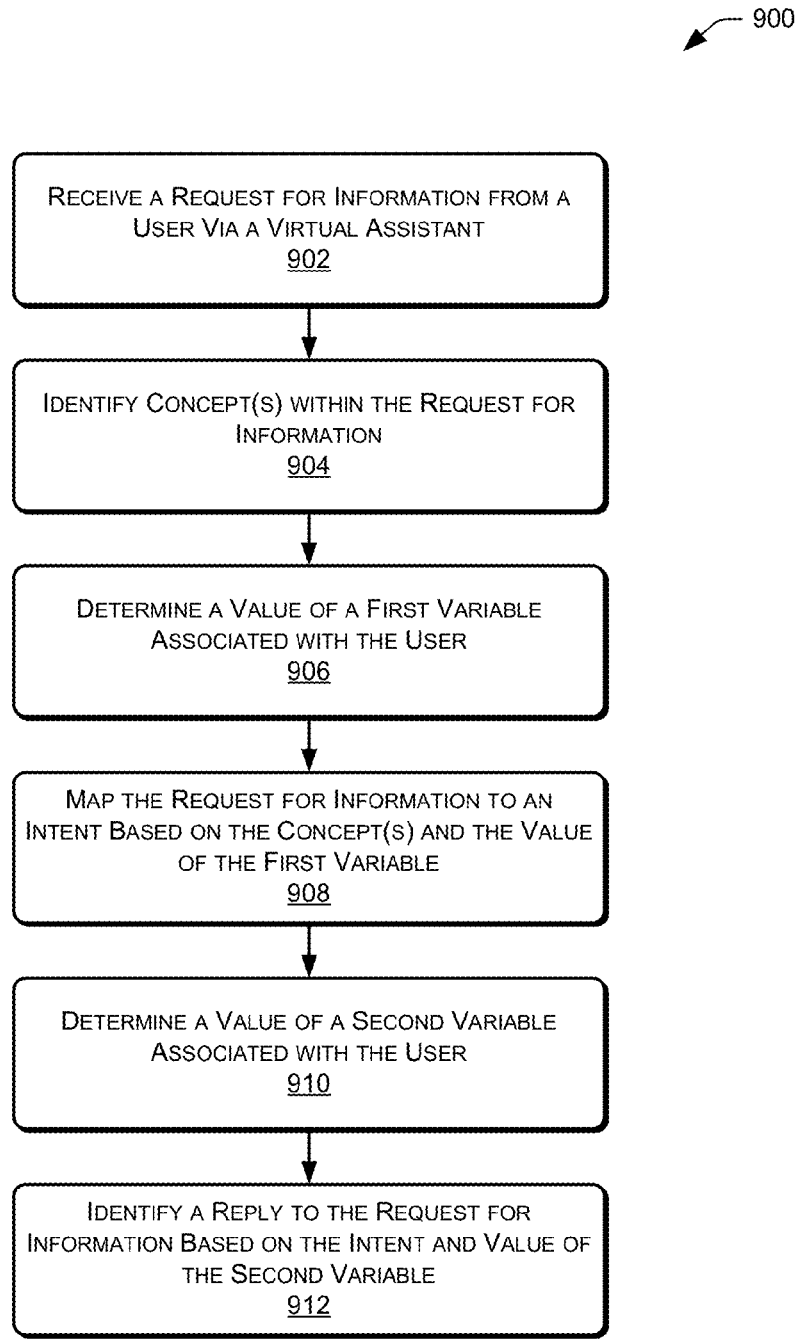

FIG. 9 illustrates yet another example process 900 for providing variable responses (or "replies") in response to received user queries. Again, this process may be performed by the virtual-assistant service 116, the service provider 106, the electronic device 104 of the user, and/or some combination thereof. At 902, the process 900 receives a request for information from a user via a virtual assistant. At 904, and in response, the process 900 identifies one or more concepts within the request for information. In addition, at 906, the process 900 determines a value of a first variable associated with the user that provided the query.

At 908, the process 900 maps the request for information to an intent based on the identified concepts and the value of the first variable. At 910, the process 900 then determines a value of a second variable associated with the user, which may or may not be different than the first variable. Finally, at 912, the process 900 identifies a reply to the request for information based on the intent and the value of the second variable. The process 900 may then provide this identified reply to a user, as described in detail above.

CONCLUSION

This document describes techniques for providing variable responses to user queries received via virtual assistants. These variable responses take into account the context of a user's query both when identifying an intent of a user's query and when identifying an appropriate response to the user's query. The techniques may thus enable virtual assistants to more intelligently emulate a representative of a service provider when responding to the user queries.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. One or more non-transitory computer-readable media storing computer-executable instructions that, when executed on one or more processors, cause the one or more processors to perform acts comprising:
    causing display of a virtual assistant associated with a service provider;
    receiving, via the virtual assistant and by a first communication channel, a single query from a user while the user engages in a session on a site of the service provider, wherein the single query comprises a fixed word or phrase;
    at least partly in response to receiving the single query and subsequent to receiving the single query:
        parsing the single query to identify one or more concepts expressed therein;
        identifying a context associated with the user or associated with the session of the user on the site, the context comprising at least one of a geolocation of the user, a time of day, a device type of a device that is used by the user to interact with the virtual assistant, a type of natural language of the single query received from the user, whether or not the user has signed in with the service provider, or a status of the user with the service provider;
        identifying, from one or more data stores storing indications of intents, a first intent associated with the single query and a second intent associated with the single query based at least in part on the one or more concepts, the first intent being mapped in the one or more data stores to a first plurality of responses and the second intent being mapped in the one or more data stores to a second plurality of responses, wherein the first plurality of responses is different than the second plurality of responses;
        mapping the single query to the first intent based at least in part on a first portion of the context;
        determining, independent of user input, a response to the single query from the first plurality of responses associated with the first intent based at least in part on the first intent and a second portion of the context, the second portion of the context being different than the first portion of the context, wherein the response specifies (i) content for output to the user via the virtual assistant, and (ii) an action to perform on behalf of the user;
        determining, based at least in part on the context, to switch from the first communication channel to provide at least a portion of the response to the user;
        selecting a second communication channel from a plurality of communication channels to utilize to provide at least the portion of the response to the user, the second communication channel being selected based at least in part on a communication channel that has been previously used to communicate by the user with the virtual assistant;
        providing at least the portion of the response to the user via the virtual assistant while refraining from providing any other response from the first plurality of responses; and
        automatically causing performance of the action on behalf of the user.

2. One or more non-transitory computer-readable media as recited in claim 1, wherein the single query comprises a string of text, and the identifying of the one or more concepts comprises identifying one or more keywords within the string of text and mapping the one or more keywords to the one or more concepts.

3. One or more non-transitory computer-readable media as recited in claim 1, wherein the single query comprises a string of text, and the identifying of the one or more concepts comprises:
    identifying one or more tokens within the string of text;
    mapping the one or more tokens to one or more vocab items; and
    pattern matching the one or more vocab items to the one or more concepts.

4. One or more non-transitory computer-readable media as recited in claim 1, wherein the determining of the response comprises mapping the first intent to one of the first plurality of responses associated with the first intent based at least in part on the second portion of the context.

5. One or more non-transitory computer-readable media as recited in claim 1, wherein the context further comprises:
    an age of the user;
    a page of the site from which the user provides the single query to the virtual assistant;
    how long the user has remained on the page of the site from which the user provides the single query to the virtual assistant;
    a navigation history of the user during the session prior to the user providing the single query to the virtual assistant;
    a location of a cursor when the user provides the single query to the virtual assistant;
    a prior query provided by the user to the virtual assistant during the session or during a prior session with the site;
    a date on which the single query is received; or
    a previous interaction between the user and the virtual assistant.

6. One or more non-transitory computer-readable media as recited in claim 1, wherein the providing of the response comprises outputting the content on a computing device of the user via the virtual assistant and causing performance of the action on behalf of the user.

7. One or more non-transitory computer-readable media as recited in claim 6, wherein the single query is received while a first page of the site of the service provider is displayed, and the action comprises causing the computing device of the user to navigate to a second, different page of the site of the service provider.

8. One or more non-transitory computer-readable media as recited in claim 6, wherein the action comprises:
   purchasing an item on behalf of the user;
   initiating a request on behalf of the user;
   initiating a communication on behalf of the user; or
   altering a reservation or order on behalf of the user.

9. One or more non-transitory computer-readable media as recited in claim 6, wherein the outputting of the content comprises;
   displaying, by the virtual assistant, plain text and one or more hyperlinks related to the single query; and
   audibly outputting content related to the single query.

10. One or more non-transitory computer-readable media as recited in claim 1, wherein the virtual assistant is configured to emulate human-to-human interaction between the user and a representative of the service provider.

11. One or more non-transitory computer-readable media as recited in claim 1, wherein the virtual assistant resembles a human when displayed on or adjacent to the site of the service provider.

12. The one or more non-transitory computer-readable media of claim 1, wherein the identifying the first intent associated with the single query and the second intent associated with the single query comprises analyzing the one or more data stores storing a plurality of predefined intents based at least in part on the one or more concepts; and
   the acts further comprising analyzing the one or more data stores to determine that the first plurality of responses are associated in the one or more data stores with the first intent and that the second plurality of responses are associated in the one or more data stores with the second intent.

13. One or more computing devices for implementing a virtual assistant that emulates human-to-human interaction, the one or more computing devices comprising:
   one or more processors; and
   one or more computer-readable media storing computer-executable instructions that, when executed on the one or more processors, cause the one or more processors to perform acts comprising:
      presenting, on a display associated with the one or more computing devices, the virtual assistant associated with a service provider;
      receiving a single query via a first communication channel comprising an interface provided by the virtual assistant, wherein the single query comprises a fixed word or phrase;
      subsequent to receiving the single query:
         identifying multiple different intents associated with the single query, the multiple different intents each being associated with a plurality of responses, each of the plurality of responses being different from each other;
         mapping the single query to an intent of the multiple different intents with reference to both contents of the single query and a first portion of context in which the virtual assistant received the single query, the context comprising at least one of a geolocation of the user, a time of day, a device type of a device that is used by the user to interact with the virtual assistant, a type of natural language of the single query received from the user, whether or not the user has signed in with the service provider, or a status of the user with the service provider;
         analyzing a database to identify multiple different responses stored in the database as being associated with the intent;
         mapping the intent to a response of the multiple different responses with reference to a second portion of the context in which the virtual assistant received the single query, wherein the multiple different responses specify (i) content for output to the interface, and (ii) an action to perform based on behalf of a user;
         determining, based at least in part on the context, to switch from the first communication channel to provide a portion of the response to the user;
         selecting a second communication channel from a plurality of communication channels to utilize to provide the portion of the response to the user from the virtual assistant, the second communication channel being selected based at least in part on a schedule of the user; and
         outputting the response while refraining from outputting any other responses of the multiple different responses, the outputting comprising:
            providing the at least the portion of the content for output via the second communication channel;
            automatically performing the action on behalf of the user.

14. One or more computing devices as recited in claim 13, wherein the virtual assistant comprises a representation of a human face, the interface comprises a text box adjacent to the representation of the human face, and the single query comprises a string of text input into the text box.

15. One or more computing devices as recited in claim 13, wherein the mapping of the single query to the intent comprises:
   identifying multiple different concepts expressed in the single query;
   identifying respective values of multiple different variables associated with the single query; and
   mapping the single query to the intent based at least in part on the concepts expressed in the single query and the values of the variables associated with the single query.

16. One or more computing devices as recited in claim 13, wherein the mapping of the intent to the response comprises:
   identifying respective values of multiple different variables associated with the single query; and
   mapping the intent to the response based at least in part on the values of the variables associated with the single query.

17. One or more computing devices as recited in claim 14, wherein:
   the mapping of the single query to the intent comprises:
      identifying multiple different concepts expressed in the single query;
      identifying respective values of a first set of variables associated with the single query; and
      mapping the single query to the intent based at least in part on the concepts expressed in the single query and the values of the first set of variables associated with the single query;
   the mapping of the intent to the response comprises:
   identifying respective values of a second set of variables associated with the single query; and
   mapping the intent to the response based at least in part on the values of the second set variables associated with the single query.

18. One or more computing devices as recited in claim 17, wherein the first and second sets of variables include at least one common variable.

19. One or more computing devices as recited in claim 17, wherein the first and second sets of variables do not include a common variable.

20. A method comprising:
under control of one or more computing systems configured to implement a virtual assistant,
receiving a single request for information from a user via the virtual assistant and via a first communication channel, wherein the single request comprises a fixed word or phrase;
subsequent to receiving the single request for information:
identifying one or more concepts within the single request for information;
identifying respective values of multiple different variables associated with the single request for information, the values of the multiple different variables collectively defining a first piece of context associated with the user, the context comprising at least one of a geolocation of the user, a time of day, a device type of a device that is used by the user to interact with the virtual assistant, a type of natural language of the single request received from the user, whether or not the user has signed in with a service provider, or a status of the user with the service provider;
identifying multiple different intents associated with the single request for information based at least in part on the identified one or more concepts, each of the multiple different intents being associated with respective responses that are different from each other;
mapping the single request for information to an intent of the multiple different intents based at least in part on the values of the multiple different variables associated with the single request for information;
determining a second piece of the context associated with the user;
identifying a reply, independent of user input and from the respective responses associated with the intent, to provide in response to the single request for information based at least in part on the intent and the determined second piece of context, wherein the identified reply specifies (i) content for output to the user via the virtual assistant, and (ii) an action to perform on behalf of the user;
determining, based at least in part on the context associated with the user, to switch from the first communication channel to provide at least a portion of the reply to the user;
selecting a second communication channel from a plurality of communication channels to utilize to provide at least a portion of the reply to the user, the second communication channel being selected based at least in part on a communication channel that has been previously used to communicate by the user with the virtual assistant; and
outputting the reply to the user while refraining from outputting any other response from the respective responses associated with the intent, the outputting comprising:
providing the at least the portion of the reply to the user via the second communication channel, and automatically causing performance of the action on behalf of the user.

21. A method as recited in claim 20, wherein the virtual assistant comprises an avatar for display on a computing device of the user, the avatar emulating a human capable of receiving single requests for information from the user and providing corresponding replies in response.

22. A method as recited in claim 20, wherein the first and second pieces of context comprise different pieces of context.

23. A method as recited in claim 20, wherein each of the multiple different intents is associated with a corresponding set of multiple different replies to provide in response to the single request for information.

24. A method as recited in claim 20, wherein the content comprises plain text, a hyperlink, and audio.

25. A method as recited in claim 20, wherein:
the single request for information is received while a computing device of the user renders a first page of a site; and
the action comprises causing the computing device of the user to navigate to a second, different page of the site.

26. A method as recited in claim 20, wherein the plurality of communication channels being selected from includes at least a web interface and a text message.

27. A method as recited in claim 20, wherein determining, based at least in part on context associated with the user, to switch from the first communication channel to a second communication channel includes at least one of:
identifying an event in a schedule associated with the user; or
identifying a change in a geo location of the user.

28. One or more non-transitory computer-readable media storing computer-executable instructions that, when executed on one or more processors, cause the one or more processors to serve or render a graphical user interface (GUI), the GUI comprising:
an avatar that emulates a human for conversing with a user, wherein the avatar is associated with a service provider;
a text box to receive, from the user, a single query comprising a string of text; and
an area to display at least a portion of a response to the single query, the response having been determined subsequent to receiving the single query and by:
parsing the single query to identify one or more concepts expressed therein, wherein the single query is received via a first communication channel;
identifying respective values of multiple different variables associated with the single query, the values of the multiple different variables collectively defining a context associated with the single query, the context comprising at least one of an age of the user, a geolocation of the user, a time of day, a device type of a device that is used by the user to interact with the avatar, or a type of natural language of the single query received from the user;
identifying multiple intents to map the one or more concepts to;
determining a first intent from the multiple intents to map the one or more concepts to based at least in part on the context associated with the single query;
identifying multiple responses associated with the first intent, the multiple responses including the response, the multiple responses comprising data that is responsive to the single query;
selecting the response from the multiple responses based at least in part on the context associated with the single query and independent of user input;

mapping the first intent and the context to the response while refraining from mapping the first intent to another response of the multiple responses, wherein the response specifies (i) content for output to the user via the avatar, and (ii) an action to perform on behalf of the user;

determining, based at least in part on the context, to switch from the first communication channel to provide at least a portion of the response to the user;

selecting a second communication channel from a plurality of communication channels to utilize to provide at least the portion of the response to the user, the second communication channel being selected based at least in part on a communication channel that has been previously used to communicate by the user with the avatar; and automatically causing performance of the action on behalf of the user.

29. One or more non-transitory computer-readable media as recited in claim 28, wherein the content includes plain text and one or more hyperlinks for display in the area.

30. One or more non-transitory computer-readable media as recited in claim 29, wherein the content includes audio for output by the avatar.

31. One or more non-transitory computer-readable media as recited in claim 28, wherein the GUI is for display on or adjacent to a site of a service provider, and the context is further associated with a value of a variable that indicates at least one of:

whether or not the user has signed in with the site of the service provider;

a status of the user with the service provider;

a page of the site from which the user provides the single query;

how long the user has remained on the page of the site from which the user provides the single query to the avatar;

a navigation history of the user on the site;

a location of a cursor when the user provides the single query;

a date on which the user provides the single query;

a time of day at which the user provides the single query;

a previous interaction between the user and the avatar;

a prior query provided by the user; or a location of the user.

\* \* \* \* \*